United States Patent
Chen et al.

(10) Patent No.: US 10,409,943 B2
(45) Date of Patent: Sep. 10, 2019

(54) EFFICIENT ANALOG LAYOUT PROTOTYPING BY LAYOUT REUSE WITH ROUTING PRESERVATION

(71) Applicant: SYNOPSYS, INC., Mountain View, CA (US)

(72) Inventors: Tung-Chieh Chen, Hsinchu (TW); Po-Cheng Pan, Hsinchu (TW); Ching-Yu Chin, Hsinchu (TW); Hung-Ming Chen, Hsinchu (TW)

(73) Assignee: SYNOPSYS, INC., Mountain View, CA (US)

( * ) Notice: Subject to any disclaimer, the term of this patent is extended or adjusted under 35 U.S.C. 154(b) by 324 days.

(21) Appl. No.: 14/475,276

(22) Filed: Sep. 2, 2014

(65) Prior Publication Data

US 2015/0067632 A1  Mar. 5, 2015

Related U.S. Application Data

(60) Provisional application No. 61/873,211, filed on Sep. 3, 2013.

(51) Int. Cl.
*G06F 17/50* (2006.01)

(52) U.S. Cl.
CPC ...... *G06F 17/5077* (2013.01); *G06F 17/5081* (2013.01); *G06F 17/505* (2013.01); *G06F 17/5068* (2013.01)

(58) Field of Classification Search
CPC ............ G06F 17/505; G06F 17/5068; G06F 17/5081; G06F 17/5077
USPC .................... 716/104, 119, 122, 126, 130
See application file for complete search history.

(56) References Cited

U.S. PATENT DOCUMENTS

| | | |
|---|---|---|
| 4,577,276 A | 3/1986 | Dunlop et al. |
| 5,361,214 A | 11/1994 | Aoki |
| 5,583,788 A | 12/1996 | Kuribayashi |
| 5,659,717 A | 8/1997 | Tse et al. |
| 5,854,752 A | 12/1998 | Agarwal |
| 5,917,729 A | 6/1999 | Naganuma et al. |
| 6,014,507 A | 1/2000 | Fujii |
| 6,161,056 A | 12/2000 | Sato |
| 6,490,713 B2 | 12/2002 | Matsumoto |
| 6,804,810 B1 | 10/2004 | Petersen et al. |
| 6,892,369 B2 | 5/2005 | Teig et al. |
| 6,931,610 B1 | 8/2005 | Buch et al. |
| 7,257,797 B1 | 8/2007 | Waller et al. |
| 7,281,233 B1 | 10/2007 | Sivasubramaniam |
| 7,506,289 B1 | 3/2009 | Champman |
| 7,603,644 B2 | 10/2009 | Waller |

(Continued)

OTHER PUBLICATIONS

Alexander Volkov. "Impact of Manufacturing on Routing Methodology at 32/22 nm," ISPD, pp. 139-140, 2011.

(Continued)

*Primary Examiner* — Stacy Whitmore
(74) *Attorney, Agent, or Firm* — Alston & Bird LLP

(57) ABSTRACT

A computer implemented method for routing preservation is presented. The method includes decomposing, using the computer, a geometric relationship between a first module, a second module, and a routing path of a source layout, when the computer is invoked to route the solution path. The method further includes disposing, using the computer, the routing path in a solution layout in accordance with the geometric relationship. The solution layout is not defined by a scaling of the source layout.

42 Claims, 14 Drawing Sheets

(56) References Cited

U.S. PATENT DOCUMENTS

| | | |
|---|---|---|
| 7,802,208 B1 | 9/2010 | Waller et al. |
| 7,823,113 B1 | 10/2010 | Waller et al. |
| 8,010,929 B2 | 8/2011 | Malhotra et al. |
| 8,099,700 B1 | 1/2012 | Waller et al. |
| 8,099,702 B2 | 1/2012 | Hou et al. |
| 8,151,232 B2 | 4/2012 | Huang et al. |
| 8,201,127 B1 | 6/2012 | Wang et al. |
| 8,271,929 B2 | 9/2012 | Laub |
| 8,332,793 B2 | 12/2012 | Bose |
| 8,402,414 B2 | 3/2013 | Tanisho et al. |
| 8,458,639 B2 | 6/2013 | Pandey et al. |
| 8,479,139 B1 | 7/2013 | Baldsdon et al. |
| 8,479,141 B1 | 7/2013 | Waller et al. |
| 8,516,159 B2 | 8/2013 | Ananthanarayanan et al. |
| 8,538,964 B2 | 9/2013 | Maqdy et al. |
| 8,683,417 B2 | 3/2014 | Chang et al. |
| 8,782,588 B2 | 7/2014 | Chang et al. |
| 2003/0018947 A1 | 1/2003 | Teig et al. |
| 2006/0080632 A1 | 4/2006 | Ng et al. |
| 2006/0206848 A1 | 9/2006 | Teig et al. |
| 2006/0288323 A1 | 12/2006 | Birch |
| 2008/0005711 A1 | 1/2008 | Scheffer |
| 2008/0216040 A1 | 9/2008 | Furnish et al. |
| 2008/0256380 A1 | 10/2008 | Tsutsumi et al. |
| 2009/0217225 A1 | 8/2009 | Sunder et al. |
| 2009/0254874 A1 | 10/2009 | Bose |
| 2009/0327989 A1 | 12/2009 | Zhuoxiang |
| 2011/0209112 A1 | 8/2011 | Laub |
| 2012/0137264 A1 | 5/2012 | Chanq et al. |
| 2012/0137265 A1 | 5/2012 | Chang et al. |
| 2012/0297354 A1 | 11/2012 | Scheffer |
| 2013/0135811 A1 | 5/2013 | Dunwoody et al. |
| 2013/0268905 A1 | 10/2013 | Pandey et al. |
| 2014/0033157 A1 | 1/2014 | Chanq et al. |
| 2014/0033158 A1 | 1/2014 | Chang et al. |

OTHER PUBLICATIONS

C. Y. Lee, "An Algorithm for Path Connections and Its Applications," IRE Transactions on Electronic Computers, pp. 346-365, 1961.

Charles J. Alpert, Gustavo E. Tellez. "The Importance of Routing Congestion Analysis," DAC, 2010.

D. Z. Pan, P. Yu, M. Cho, A. Ramalingam, K. Kim, A. Rajaram, and S. X. Shi. "Design for Manufacturing Meets Advanced Process Control: A Survey," Journal of Process Control, vol. 18, No. 10, pp. 975-984, 2008.

Danny Rittman. "Nanometer DFM—The Tip of the Ice," http://www.tayden.com/publications/Nanometer%20DFM.pdf.

Dirk Muller. "Optimizing Yield in Global Routing," ICCAD, pp. 480-486, 2006.

E. Papadopoulou and D. T. Lee. "Critical Area Computation via Voronoi Diagrams," IEEE Trans. on Computer-Aided Design of Integrated Circuits and Systems, vol. 18, No. 4, pp. 463-474, 1999.

Fong-Yuan Chang, Ren-Song Tsay and Wai-Kei Mak, "How to Consider Shorts and Guarantee Yield Rate Improvement for Redundant Wire Insertion," ICCAD, pp. 33-38, 2009.

Fong-Yuan Chang, Ren-Song Tsay, Wai-Kei Mak and Sheng-Hsiung Chen, "A Separation and Minimum Wire Length Constrained Maze Routing Algorithm Under Nanometer Wiring Rules," in ASP-DAC Jan. 23, 2013, pp. 175-180.

Fong-Yuan Chang, Ren-Song Tsay, Wai-Kei Mak and Sheng-Hsiung Chen, "Mana: A Shortest Path Maze Algorithm under Separation and Minimum Length Nanometer Rules," IEEE Transactions on Computer-Aided Design of Integrated Circuits and Systems. vol. 32, Issue: 10, Oct. 2013, pp. 1557-1568.

J. Mitra, P. Yu, and D. Z. Pan. "RADAR: RET-Aware Detailed Routing Using Fast Lithography Simulations," DAC, pp. 369-372, 2005.

L. Huang and D.F. Wong. "Optical Proximity Correction (OPC)—Friendly Maze Routing," DAC, pp. 186-191, 2004.

M. Cho, D. Z. Pan, H. Xiang, and R. Puri. "Wire Density Driven Global Routing for CMP Variation and Timing," ICCAD, pp. 487-492, 2006.

M. Cho, J. Mitra, and D. Z. Pan. "TROY: Track Router with Yield-Driven Wire Planning," DAC, pp. 55-58, 2007.

M. Cho, J. Mitra, and D. Z. Pan. "Manufacturability-Aware Routing," in: Handbook of Algorithms for VLSI Physical Design Automation, CRC Press, 2009.

Mo et al., "Fishbone: A Block-Level Placement and Routing Scheme", ISPD '03: Proceedings of the 2003 International Symposium on Physical Design, Publisher ACM, Apr. 2003, 6 pgs.

Non-Final Office Action for U.S. Appl. No. 13/289,965 dated Mar. 28, 2014, 11 pages.

Non-Final Office Action for U.S. Appl. No. 13/289,963, dated Nov. 9, 2012, 8 pages.

Non-Final Office Action for U.S. Appl. No. 13/289,965, dated Nov. 30, 2012, 10 pages.

Non-Final Office Action for U.S. Appl. No. 14/043,619, dated Nov. 7, 2013, 9 pages.

Non-Final Office Action for U.S. Appl. No. 14/043,689, dated May 27, 2014, 12 pages.

Notice of Allowance for U.S. Appl. No. 13/289,963, dated Apr. 18, 2013, 6 pages.

Notice of Allowance for U.S. Appl. No. 13/289,963, dated Jun. 12, 2013, 6 pages.

Notice of Allowance for U.S. Appl. No. 13/289,963, dated Nov. 20, 2013, 7 pages.

Notice of Allowance for U.S. Appl. No. 13/289,965, dated Jun. 10, 2013, 8 pages.

Notice of Allowance for U.S. Appl. No. 13/289,965, dated Oct. 3, 2014, 10 pages.

Notice of Allowance for U.S. Appl. No. 14/043,619 dated Mar. 6, 2014, 9 pages.

P. E. Hart, N. J. Nilsson and B. Raphael, "A Formal Basis for the Heuristic Determination of Minimum Cost Paths," IEEE Trans. on Systems Science and Cybernetics, No. 4, pp. 100-107, 1968.

S. R. Nassif and K. J. Nowka. "Physical Design Challenges Beyond the 22 nm Node," ISPD, pp. 13-14, 2010.

Zhang et al., "GDRouter: Interleaved Global Routing and Detailed Routing for Ultimate Routability", DAC '12, Proceedings of the 49th Annual Design Automation Conference, Publisher ACM, Jun. 2012, 6 pgs.

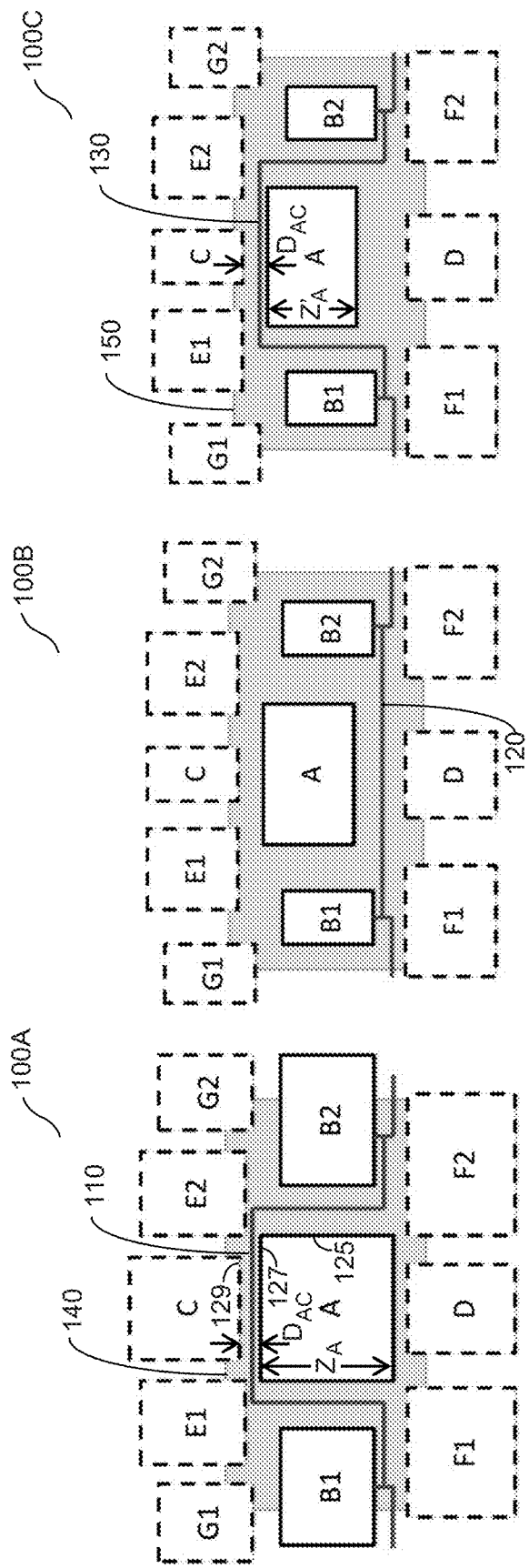

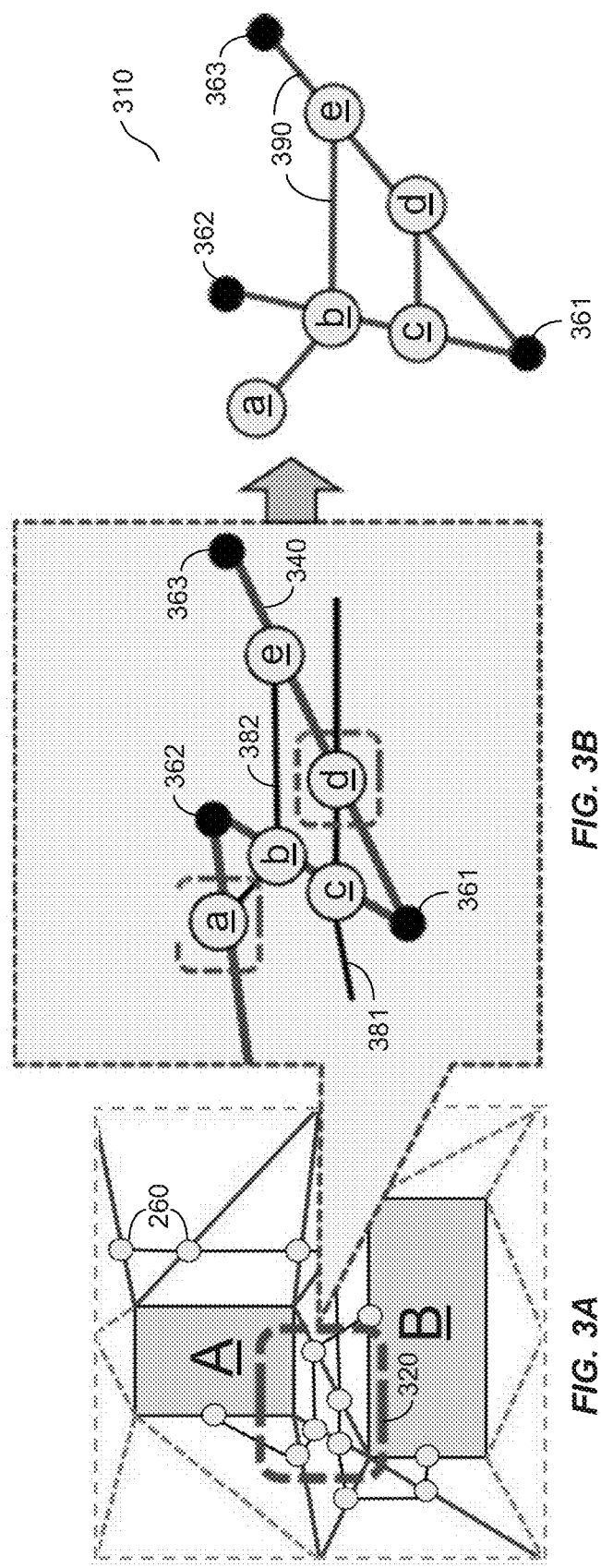

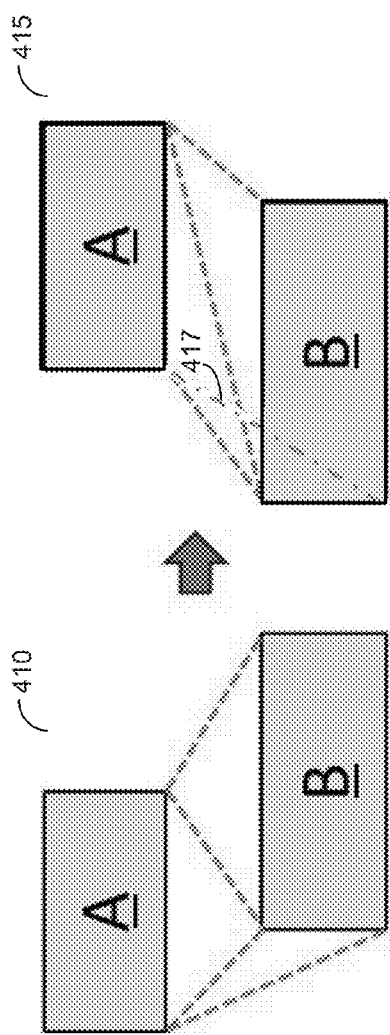
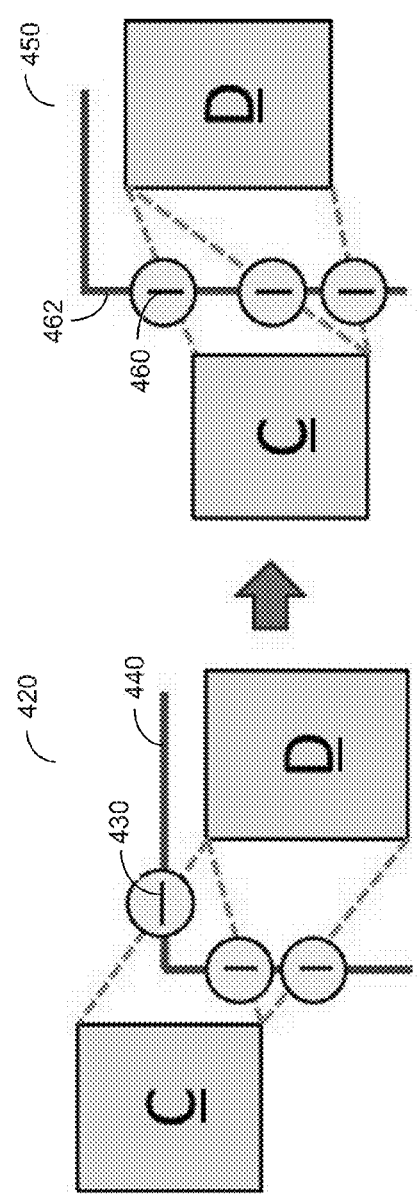
FIG. 4A  FIG. 4B  FIG. 4C  FIG. 4D

EFFICIENT ANALOG LAYOUT PROTOTYPING BY LAYOUT REUSE WITH ROUTING PRESERVATION

CROSS-REFERENCES TO RELATED APPLICATIONS

This application claims priority, under 35 U.S.C. § 119(e), from U.S. Provisional Application No. 61/873,211, filed on Sep. 3, 2013, entitled "EFFICIENT ANALOG LAYOUT PROTOTYPING BY LAYOUT REUSE WITH ROUTING PRESERVATION", the contents of all of which is incorporated herein by reference in its entirety.

BACKGROUND

The present invention relates generally to a method and system for computer aided design (CAD) of integrated circuits (IC) and in particular to layout generation of analog circuits by preserving routing used in a reference layout.

The layout of an IC is stored as data in a computer memory while the IC is designed and transformed to lithography masks used in the printing of semiconductor wafers during the IC manufacturing process. Analog IC electrical characteristics are particularly sensitive to the placement of circuit blocks and traces in the layout. CAD techniques are used by designers extensively in the design and verification of the layout. CAD techniques are also used to keep pace with semiconductor process changes over time that use smaller dimensions to drive better performance at a smaller technology node, which requires changing and verifying the layout according to new design constraints. Fabless companies must also deal with different design constraints even at the same technology node when moving an IC design from one semiconductor fab to another. Automated placement of circuit blocks and the routing of interconnect paths between blocks reduces the engineering cost of migrating an existing design to a new technology node or to a different fab.

Analog IC electrical characteristics are particularly sensitive to the placement of circuit blocks and traces in the layout. Therefore, automated layout generation for analog circuits in advanced technologies is challenging. For decades, to ease the impact from process variation at the transistor level and to ensure high electrical performance, analog layout design has mostly relied on designers' expertise. However, iterative refinement on manual design lengthens the design cycle time on analog layout. Yet, layout design in advanced technology nodes requires consideration of more constraints making the reuse of existing designs more valuable instead of generating new designs from the beginning. Thus, reusable layout template preservation becomes advantageous.

To preserve the design knowledge from an analog template layout, a devices' relative position and routing behaviors should be considered carefully. Typical analog constraints such as symmetry and proximity constraints fundamentally regulate the analog placement. On the other hand, wire symmetry and topological matching are critical to analog routing. Placement and routing from the template layout can be preserved via extraction. The more information extracted from template layout, more likely it preserves the circuit characteristics. Currently, analog layout preservation pays more attention on placement for topology extraction. However, path or wire or net routing behavior extraction is seldom addressed in previous works. Thus there is a need for a methodology to preserve the correlation among existing placement and routing for quick layout generation.

The problem of layout reuse considering analog constraints can be grouped into two stages, placement and routing. At the placement stage, certain approaches mainly focus on compaction and symmetry island generation. Since compaction retains almost the same topology from the source layout, it constructs a symbolic structure to preserve layout topology, technology rules, symmetry and proximity constraints. One solution efficiently provides prototypes with another algorithm in migrated layouts due to the difference scale ratio among devices and reduces the white space under target technology and obtains better performance after post-layout simulation. With symmetry island generation, symmetry pairs are treated as symmetry island and reduce the sensitivity of thermal gradients and process variations. One solution demonstrates hierarchical slicing-tree representation considering monotonic current paths. In addition, a routability-driven analog placement is proposed in another solution.

For routing, existing research focuses on resolving routing with constraints. Early works propose a maze-style router considering symmetry and non-symmetry modules in the same design. Some solutions adopt a channel router to deal with mirror symmetry and detailed routing among blocks. In one solution, matching topology other than the symmetry issue is addressed in placement stage and routing methodology. One solution first defines three typical matching constraints for analog routing which impacts performance most: i) symmetry, ii) topology-matching, and iii) length-matching. In another solution it is proposed that routing priority considering constraint groups in hierarchy can enhance the signal integrity.

Overall, although the symmetry and matching constraints are treated and routing matching constraints are extended further, the correlation among wiring and placement has not been systematically considered. Thus, there is a need for a better way to generate new layout of analog circuits to preserve electrical characteristics of a reference or source design layout by systematically correlating wiring and block placement.

SUMMARY

According to one embodiment of the present invention, a computer implemented method for routing a solution path is presented. The method includes extracting, using the computer, from a source layout a position of a source path disposed along a first side of a first block and a first side of a second block, when the computer is invoked to route the solution path. The method further includes generating, using the computer, in the solution layout the solution path while maintaining the position of the source path along the first side of the first block and the first side of the second block. A nearest distance between the first and second blocks in the source layout is scaled in the solution layout by a first number and at least one edge of either the first or second blocks in the source layout is scaled in the solution layout by a second number different from the first number.

According to one embodiment, the method further includes extracting, using the computer, from the source layout a position of the source path disposed along the first side of the first block and a first side of a third block after extracting the position of the source path disposed along the first side of the first block and the first side of the second block thereby hierarchically extracting the position of the source path. The method further includes generating, using the computer, in the solution layout the solution path while maintaining the source path along the first side of the first block and the first side of the third block.

According to one embodiment, the first and second blocks are clustered in accordance with symmetry and proximity constraints. According to one embodiment, the solution path is included in an analog circuit. According to one embodiment, extracting further includes transforming the source layout into a planar straight-line graph via a triangulation algorithm. According to one embodiment, transforming further includes generating a crossing graph associated with a multitude of crossing points disposed at the intersection between the source path and a multitude of edges dividing a source routing plane into a multitude of non-overlapping triangles except where the first and second blocks of the source layout are disposed.

According to one embodiment, the source routing plane is a region of the source layout where the source path is disposed. According to one embodiment, at least one of the multitude of edges represents a geometrical relationship between the first block, the second block, of the source layout and the source routing plane. According to one embodiment, the multitude of non-overlapping triangles include a multitude of vertices each disposed at a different one of a multitude of corners of the first block, the second block, and the source routing plane and disposed along at least a different one of a multitude of edges of the source routing plane. According to one embodiment, transforming further includes storing at least one path direction associated with one of the multitude of crossing points.

According to one embodiment, the planar straight-line graph includes a multitude of edges dividing a source routing plane into a multitude of non-overlapping triangles except where the first and second blocks of the source layout are disposed, the source routing plane being a region of the source layout where the source path is disposed. A pair of vertices define each different one of the multitude of edges when the pair of vertices are disposed on the same edge of one of the multitude of non-overlapping triangles or when the pair of vertices are disposed adjacently on the source path. According to one embodiment, generating a solution path further includes recovering the planar straight-line graph in accordance with the solution layout, and generating a multitude of segments in accordance with the multitude of crossing points included in the recovered planar straight-line graph, the solution path including the multitude of segments.

According to one embodiment, the multitude of non-overlapping triangles of the source layout include a multitude of vertices each disposed at a different one of a multitude of corners of the first block, the second block, the source routing plane and disposed along at least a different one of a multitude of edges of the source routing plane. Recovering the planar straight-line graph includes repositioning each of the multitude of vertices associated with the different ones of the multitude of corners when at least one of the multitude of corners is repositioned in the solution layout. According to one embodiment, transforming further includes storing at least one path direction associated with one of the multitude of crossing points. Generating a multitude of segments is further in accordance with the at least one path direction.

According to one embodiment of the present invention, a computer implemented method for routing preservation is presented. The method includes decomposing, using the computer, a geometric relationship between a first module, a second module, and a routing path of a source layout, when the computer is invoked to route the solution path. The method further includes disposing, using the computer, the routing path in a solution layout in accordance with the geometric relationship. The solution layout is not defined by a scaling of the source layout.

According to one embodiment, decomposing further includes using a multitude of non-overlapping triangles. According to one embodiment, the multitude of non-overlapping triangles are generated by a Constrained Delaunay Triangulation algorithm. According to one embodiment, the multitude of non-overlapping triangles are geometrically associated with the first module, the second module, and the routing path. According to one embodiment, decomposing further includes forming a planar straight-line graph from the multitude of non-overlapping triangles. According to one embodiment, disposing further includes updating the planar straight-line graph in accordance with the position of the first and second blocks in the solution layout.

According to one embodiment of the present invention, a non-transitory computer-readable storage medium including instructions which when executed by a computer cause the computer to extract from a source layout a position of a source path disposed along a first side of a first block and a first side of a second block, when the computer is invoked to route the solution path. The instructions further cause the computer to generate in the solution layout the solution path while maintaining the position of the source path along the first side of the first block and the first side of the second block. A nearest distance between the first and second blocks in the source layout is scaled in the solution layout by a first number, and at least one edge of either the first or second blocks in the source layout is scaled in the solution layout by a second number different from the first number.

According to one embodiment, the instructions further cause the computer to extract from the source layout a position of the source path disposed along the first side of the first block and a first side of a third block after extracting the position of the source path disposed along the first side of the first block and the first side of the second block thereby hierarchically extracting the position of the source path. The instructions further cause the computer to generate in the solution layout the solution path while maintaining the source path along the first side of the first block and the first side of the third block.

According to one embodiment, the instructions that cause the computer to extract further causes the computer to transform the source layout into a planar straight-line graph via a triangulation algorithm. According to one embodiment, the instructions that cause the computer to transform further causes the computer to generate a crossing graph associated with a multitude of crossing points disposed at the intersection between the source path and a multitude of edges that divide a source routing plane into a multitude of non-overlapping triangles except where the first and second blocks of the source layout are disposed. According to one embodiment, the instructions that causes the computer to transform further cause the computer to store at least one path direction associated with one of the multitude of crossing points.

According to one embodiment, the instructions that cause the computer to generate a crossing graph further causes the computer to recover the planar straight-line graph in accordance with the solution layout, and generate a multitude of segments in accordance with the multitude of crossing points included in the recovered planar straight-line graph, the solution path including the multitude of segments. According to one embodiment, the instructions that cause the computer to transform further cause the computer to store at least one path direction associated with one of the multitude of crossing points. The instructions that cause the computer to generate a multitude of segments are further in accordance with the at least one path direction.

According to one embodiment of the present invention, a non-transitory computer-readable storage medium including instructions which when executed by a computer cause the computer to decompose a geometric relationship between a first module, a second module, and a routing path of a source layout, when the computer is invoked to route the solution path. The instructions further cause the computer to dispose the routing path in a solution layout in accordance with the geometric relationship. The solution layout is not defined by a scaling of the source layout.

According to one embodiment, the instructions that cause the computer to decompose further cause the computer to use a multitude of non-overlapping triangles. According to one embodiment, the instructions that cause the computer to decompose further cause the computer to form a planar straight-line graph from the multitude of non-overlapping triangles. According to one embodiment, the instructions that cause the computer to dispose further cause the computer to update the planar straight-line graph in accordance with the position of the first and second blocks in the solution layout.

According to one embodiment of the present invention, a system for routing a solution path is configured to extract from a source layout a position of a source path disposed along a first side of a first block and a first side of a second block, when the computer is invoked to route the solution path. The system is further configured to generate in the solution layout the solution path while maintaining the position of the source path along the first side of the first block and the first side of the second block. A nearest distance between the first and second blocks in the source layout is scaled in the solution layout by a first number and at least one edge of either the first or second blocks in the source layout is scaled in the solution layout by a second number different from the first number.

According to one embodiment, the system is further configured to extract from the source layout a position of the source path disposed along the first side of the first block and a first side of a third block after extracting the position of the source path disposed along the first side of the first block and the first side of the second block thereby hierarchically extracting the position of the source path. The system is further configured to generate in the solution layout the solution path while maintaining the source path along the first side of the first block and the first side of the third block.

According to one embodiment, the system is further configured to transform the source layout into a planar straight-line graph via a triangulation algorithm. According to one embodiment, the system is further configured to generate a crossing graph associated with a multitude of crossing points disposed at the intersection between the source path and a multitude of edges that divide a source routing plane into a multitude of non-overlapping triangles except where the first and second blocks of the source layout are disposed. According to one embodiment, the system is further configured to store at least one path direction associated with one of the multitude of crossing points.

According to one embodiment, the system is further configured to recover the planar straight-line graph in accordance with the solution layout, and generate a multitude of segments in accordance with the multitude of crossing points included in the recovered planar straight-line graph, the solution path including the multitude of segments. According to one embodiment, the system is further configured to store at least one path direction associated with one of the multitude of crossing points. The instructions that cause the computer to generate a multitude of segments are further in accordance with the at least one path direction.

According to one embodiment of the present invention, a system for routing preservation is configured to decompose a geometric relationship between a first module, a second module, and a routing path of a source layout, when the computer is invoked to route the solution path. The system is further configured to dispose the routing path in a solution layout in accordance with the geometric relationship. The solution layout is not defined by a scaling of the source layout.

According to one embodiment, the system is further configured to use a multitude of non-overlapping triangles. According to one embodiment, the system is further configured to form a planar straight-line graph from the multitude of non-overlapping triangles. According to one embodiment, the system is further configured to update the planar straight-line graph in accordance with the position of the first and second blocks in the solution layout.

A better understanding of the nature and advantages of the embodiments of the present invention may be gained with reference to the following detailed description and the accompanying drawings.

BRIEF DESCRIPTION OF THE DRAWINGS

FIGS. 1A-1C depict simplified examples of several ways to reuse circuit block placements under different routing strategies. FIG. 1A depicts a first simplified reference layout, which may be used with embodiments of the present invention.

FIG. 1B depicts a new simplified layout based on the reference layout depicted in FIG. 1A without routing preservation.

FIG. 1C depicts a new simplified solution layout based on the reference layout depicted in FIG. 1A with routing preservation, in accordance with one embodiment of the present invention.

FIG. 2A depicts another simplified reference layout, in accordance with one embodiment of the present invention.

FIG. 2B depicts a simplified exemplary CDT graph generated from the reference layout in FIG. 2A, in accordance with one embodiment of the present invention.

FIG. 2C depicts a multitude of exemplary CDT edges associated with the source routing path depicted in FIG. 2B, in accordance with one embodiment of the present invention.

FIG. 2D depicts exemplary crossing points located along the source routing path depicted in the reference layout in FIG. 2C and located along a second one of a multitude of source routing paths, in accordance with one embodiment of the present invention.

FIG. 2E depicts exemplary storage of routing behavior by the CDT graph and the crossing points depicted in FIG. 2D, in accordance with one embodiment of the present invention.

FIG. 3A depicts a portion of FIG. 2E, in accordance with one embodiment of the present invention.

FIG. 3B depicts exemplary crossing direction data associated with a subset of the crossing points depicted in FIG. 3A, in accordance with one embodiment of the present invention.

FIG. 3C depicts an exemplary portion of a crossing graph associated with the subset of the crossing points depicted in FIG. 3B, in accordance with one embodiment of the present invention.

FIG. 4A-4D depict exemplary behavior of a crossing graph in response to placement changes, in accordance with one embodiment of the present invention. FIG. 4A depicts an exemplary source CDT graph $G_{CDT}$ including two source blocks, in accordance with one embodiment of the present invention.

FIG. 4B depicts an exemplary updated crossing graph in response to block placement changes to the source CDT graph $G_{CDT}$ depicted in FIG. 4A, in accordance with one embodiment of the present invention.

FIG. 4C depicts an exemplary source CDT graph $G_{CDT}$ associated with another source layout, in accordance with one embodiment of the present invention.

FIG. 4D depicts an exemplary updated solution CDT graph $G_{CDT}$ in a solution layout associated with the source CDT graph $G_{CDT}$ 420 depicted in FIG. 4C, in accordance with one embodiment of the present invention.

FIG. 5A depicts an exemplary reference frame, in accordance with one embodiment of the present invention.

FIG. 5B depicts a first case of generalized crossing direction response to placement changes, in accordance with one embodiment of the present invention.

FIG. 5C depicts a second case of generalized crossing direction response to placement changes, in accordance with one embodiment of the present invention.

FIG. 8A-9F depict exemplary multilevel crossing graph generation, in accordance with one embodiment of the present invention. FIG. 8A depicts an exemplary source layout including three blocks and two paths, which may be used with embodiments of the present invention.

FIG. 9A depicts exemplary experimental crossing graph results of embodiments of the present invention applied to an extracted operational amplifier (OpAmp) circuit under wafer foundry A's 90 nm processing before updating.

FIG. 9B depicts exemplary experimental crossing graph results of embodiments of the present invention applied to an OpAmp circuit under wafer foundry B's 90 nm processing after updating from the experimental results depicted in FIG. 9A.

FIG. 9C depicts exemplary experimental crossing graph results of embodiments of the present invention applied to an extracted variable gain amplifier (VGA) circuit under wafer foundry A's 90 nm processing before updating.

FIG. 9D depicts exemplary experimental crossing graph results of embodiments of the present invention applied to a VGA circuit under wafer foundry A's 65 nm processing after updating from the experimental results depicted in FIG. 9C.

FIG. 10A depicts exemplary experimental layout results for an OpAmp circuit under wafer foundry A's 90 nm processing using manual routing on the source layout.

FIG. 10B depicts exemplary experimental layout results for a VGA circuit under wafer foundry A'S 90 nm processing using manual routing on the source layout.

FIG. 10C depicts exemplary experimental layout results of embodiments of the present invention applied to the OpAmp circuit under wafer foundry B's 90 nm processing by migrating the design using the layout generator.

FIG. 10D depicts exemplary experimental layout results of embodiments of the present invention applied to the VGA circuit under wafer foundry A's 65 nm processing by migrating the design using the layout generator.

DETAILED DESCRIPTION

Figure 2A:
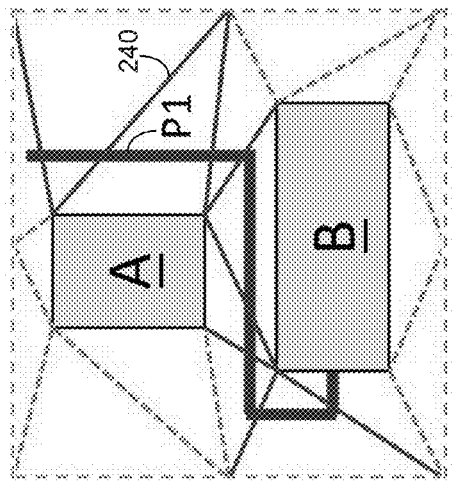
FIGS. 2A-2E depict routing preservation via decomposing the source layout by CDT, in accordance with embodiments of the present invention.

According to embodiments of the present invention, a method and system for generating layout of analog circuits by preserving routing used in a reference or source layout is presented.

FIG. 1A-1C depict simplified examples of several ways to reuse circuit block placements under different routing strategies. FIG. 1A depicts a first simplified reference layout 100A, hereinafter also referred to as a "source layout," which may be used with embodiments of the present invention. Source layout 100A includes one or more source blocks A, B1, B2, C, D, E1, E2, F1, F2, G1, G2 and a source routing path 110, hereinafter also referred to as a "source path." Source path 110 is located between blocks A and C. In other words, the position of source path P1may be disposed along a first side 127 of a first block A and a first side 129 of a second block C. The source layout is to be converted into a new automatically generated layout in two ways; without and with routing preservation, where "routing preservation" is a term used to generally describe embodiments of the present invention. Source layout 100A further includes source routing plane 140, which is a region of the layout where the original source routing path 110 and any new routing may be routed, located, or disposed in the solution layout.

FIG. 1B depicts a new simplified layout 100B based on the reference layout depicted in FIG. 1A without routing preservation. In other words, the new analog layout in FIG. 1B is automatically generated in accordance to known analog constraints only and includes the same modules/blocks as in FIG. 1A but sized and placed according to new design constraints. As a result, the size of individual blocks may be different, smaller in this example, and may be placed in different positions than in the source layout. In the layout depicted in FIG. 1B the result of automatic routing without routing preservation is to locate routing path 120, corresponding to path 110 in FIG. 1A, in a new position between blocks A and D instead of between blocks A and C as in the source layout.

FIG. 1C depicts a new simplified solution layout 100C based on the reference layout depicted in FIG. 1A with routing preservation, in accordance with one embodiment of the present invention. The algorithms and systems described in the embodiments of the present invention using routing preservation are hereinafter also generally referred to as the "layout generator." The reuse of the source blocks to form new block positions and sizes in the solution layout included in the analog circuit are the same as in FIG. 1B. Referring simultaneously to FIG. 1A and FIG. 1C, it is noted that the terms "routing preservation", "reuse," and the "layout generator" used to form the solution layout are not directed towards the simple case where the source layout as a whole is merely linearly scaled, e.g. linearly shrunk or linearly enlarged, as is commonly known. Instead, the terms "routing preservation", "reuse," and the "layout generator" as applied in the embodiments of the present invention are directed to a more complex or arbitrary block resizing and block repositioning technique rather than merely linearly scaling the source layout to form the solution layout. In other words, the solution layout is not defined by a scaling of the source layout.

For example, blocks A, C in source layout 100A are reused in solution layout 100C such that a nearest distance $D_{AC}$ between first and second blocks A, C in source layout 100A is scaled in solution layout 100C by a first number, such as for example about 1.0, and at least one edge of either the first or second blocks, such as edge 125 of block A, in source layout 100A is scaled in solution layout 100C by a second number, such as for example 0.7, which is different from the first number of 1.0. In other word, the height $Z_A$ of block A in source layout 100A is significantly scaled down to height $Z'_A$ of block A in solution layout 100C, while the nearest distance $D_{AC}$ remains constant. In contrast, for the case of a simple linear shrink, the first and second numbers would be the same and the size of each edge of block B would be scaled from the source layout into the solution layout by the same amount or number as the distance between blocks A, C is scaled.

In one embodiment, the ratio of a first size of a first edge of a first module in the source layout to a second size of the first edge of the first module in the solution layout is different from the ratio of a third size of a first edge of a second module in the source layout to a fourth size of the first edge of the second module in the solution layout. In contrast, in a linear scaling of the source layout, the ratio of a first size of a first edge of a first module in the source layout to a second size of the first edge of the first module in the solution layout would be the same as the ratio of a third size of a first edge of a second module in the source layout to a fourth size of the first edge of the second module in the solution layout.

In contrast to FIG. 1B, because solution layout 100C in FIG. 1C was generated with routing preservation by the layout generator, the location of path 130 corresponds more closely to the source routing and is again located between blocks A and C. In other words routing preservation with the layout generator includes more routing information from the reference layout in FIG. 1A than known techniques. Source path 130 may be included in an analog circuit. Table 1 below shows timing and simulation results for the layouts depicted in FIGS. 1A-1C using a 65 nm technology from a particular semiconductor wafer foundry as a test case.

TABLE 1

| Layout | Runtime | $A_v$ (db) |
| --- | --- | --- |
| FIG. 1A | 8 hrs | 43.421 |
| FIG. 1B | 20 sec | 43.02 |
| FIG. 1C | 2 hrs | 43.425 |

Referring simultaneously to FIGS. 1A, 1B, and 1C, even though routing path 130 from B1 to B2 is longer by detouring around block A and between blocks A and C in solution layout 100C by preserving the routing of the reference or source layout 100A, the simulation results show that routing path 130 earns better voltage gain performance by over 0.4 dB than shorter routing path 120, which connects the path directly straight across the tunnel between blocks A and D. Routing preservation according to the layout generator embodiments of the present invention maintain the high voltage gain performance of the source layout, while reducing design time by a factor of 4 over the original source layout design. The analog performance may not be guaranteed with a new layout so multiple layout prototypes may need to be generated and verified. Therefore, the preserved routing information technique via the layout generator benefits prototype solution layout generation and is capable of efficiently extracting source layout constraints with efficient runtime that are reusable to achieve valuable circuit performance.

According to one embodiment, to rapidly generate the analog layout on the target technology with the best routing preservation, an analog routing preservation algorithm via Constrained Delaunay Triangulation (CDT) decomposes the blocks, hereinafter also referred to as "modules," and routing channels, hereinafter also referred to as "paths" or "nets," with a set or multitude of triangles. These triangles are used to translate the correlation or relationship between routing and block placement into a planar straight-line graph (PSLG). A PSLG is good at recording the correlation among vertices on the plane such that the PSLG is adaptable to layout migration. Migrated routing on the target technology is effectively reestablished based on the same placement topology as the source layout through an updated PSLG. Moreover, a multilevel framework according to the design hierarchy is presented to reduce redundant paths and mismatch between source and solution routing, while improving the design and runtime performance.

One embodiment includes a CDT-based extraction algorithm for analog routing, which considers the placement topology and the correlation between routing and block placement. The Delaunay Triangulation generally partitions the source routing plane into triangles. The triangulation is extended to deal with the problem of routing paths between obstacles. Another embodiment of the present invention includes a new representation for analog routing preservation based on an existing placement of blocks in the layout. A routing representation is described, which can apply to any slicing and non-slicing placement. The representation deals with routing behaviors with accuracy and flexibility. In another embodiment, a bottom-up framework for analog layout prototyping is provided. Experimental data is provided demonstrating on various analog placement examples, that the layout generator accurately preserves the correlation between placement and routing. This multilevel framework simultaneously reduces the redundancy of routing, and retains circuit performance in the solution layout that is comparable to the circuit performance in the source layout. One embodiment of the present invention includes a versatile analog layout generator that illustrates the layout generator prototyping framework is capable of producing layout routing results for different types of source layout topologies and circuits. An experiment examines eight different topologies or solution layouts for two different reference circuits and the resultant solution layouts show that the layout generator re-constructs multiple layouts efficiently while preserving circuit performance.

In one embodiment, the layout generator at least solves the following analog layout prototyping problem. A source layout template L with M placement modules or blocks and N nets with each net consisting of a set of routing paths are given. One objective is to provide multiple layout solutions for designers. With layout reuse as a premise, the problem can be further divided into three sub-problems as follows. The first sub-problem is routing topology extraction and preservation, which given a layout L with a set or multiple of placement blocks β and routing paths P, the problem being extracting β and P from L into a representation Ω which includes placement and routing topology information. The second sub-problem is multiple placement generation generating several possible placement solutions from the given layout template L. The third sub-problem is routing reconstruction given the new positions and sizes of the multitude of placement blocks in the set of placement blocks β, to generate a routing layout result from Ω that reflects the original routing behavior.

According to embodiments of the present invention, layout extraction and preservation using constrained Delaunay triangulation includes the following. To capture or extract routing topology, the correlation among placement blocks and the position information of routing channels should be extracted and stored. According to one embodiment, the placement blocks and routing channels of input or source layout are transformed into a planar straight line graph using the Constrained Delaunay Triangulation (CDT). CDT is a generalization of Delaunay Triangulation (DT), where the difference is that CDT forces additional segments associated with the routing paths P into the triangulation.

FIGS. 2A-2E depict routing preservation via decomposing the source layout by CDT, in accordance with embodiments of the present invention. FIG. 2A depicts another simplified reference layout, in accordance with one embodiment of the present invention. The reference layout in this embodiment includes a source routing plane 210 and a multitude of placement blocks β, which in turn includes one source block A and another source block B disposed in a first predetermined relationship within source routing plane 210. The reference layout in this embodiment further includes at least one source path P1 depicted as a thick line and disposed in a second predetermined relationship with the source routing plane and the at least one source block. Source routing plane 210 may be bounded by a multitude of routing plane boundaries 227. In this example, source routing plane 210 includes four routing plane boundaries.

Figure 2B:
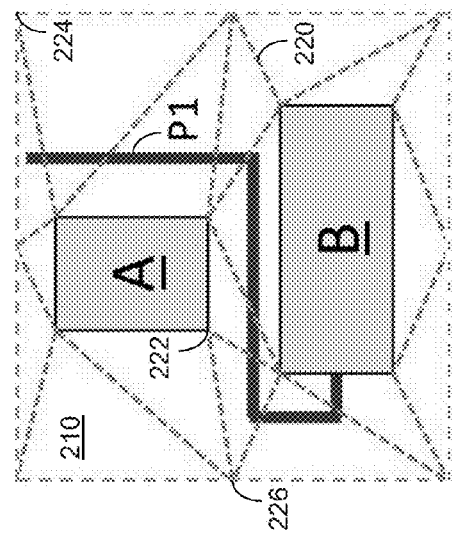

FIG. 2B depicts a simplified exemplary CDT graph $G_{CDT}$ generated from the reference layout in FIG. 2A and the source path P1, in accordance with one embodiment of the present invention. CDT graph $G_{CDT}$ includes a multitude of CDT edges 220 depicted as dashed lines, whose construction includes the following. Each one of the multitude of CDT edges 220 is terminated by a pair of vertices. Given a source routing plane 210 and a set or multitude of placement blocks $\beta=\{b_i|1\leq i\leq|\beta|\}$, the vertex set of the layout extraction CDT, hereinafter also referred to as a "multitude of CDT vertices," is defined to be $V_{CDT}=V_C\cup V_{RP}$ with $V_C=\{(x_i, y_i)|1\leq i\leq 4|\beta|\}$ being a multitude of corner points 222 of the multitude of blocks in β. In this example, set of placement blocks β includes the multitude of blocks A, B. $V_{RP}$ includes a multitude of points located along the periphery of the source routing plane 210, e.g. the multitude of four corners 224 of the routing plane 210. $V_{RP}$ further includes the multitude of four middle-points 226 of each different one of the multitude of four routing plane boundaries 227. In one embodiment, each one of the multitude of middle-points 226 may bisect a different one of the multitude of routing plane boundaries 227. Regions that forbid or exclude the multitude of CDT edges 220 are identified as a multitude or set of holes H in the CDT formulations. In this embodiment, the multitude of holes H includes the areas inside the multitude of blocks, e.g. inside the blocks A, B depicted in grey.

The CDT graph $G_{CDT}$ is generated from the vertex set $V_{CDT}$ and hole set H. The CDT graph $G_{CDT}$ can be represented as $G_{CDT}=\{V_{CDT}, E_{CDT}, T, H\}$, where the multitude of CDT edges 220 identified as the set $E_{CDT}=\{(v_i, v_j)|v_i, v_j\in V_{CDT}\}$, which splits or decomposes the plane into a multitude or set of non-overlapping triangles T and rectangular holes H. Therefore, CDT graph $G_{CDT}$ includes the multitude of CDT vertices 222, 224, 226, and $E_{CDT}$ or the multitude of CDT edges 220, forming triangles T that divide or split the source routing plane 210, excluding the multitude of holes H, e.g., outside the interiors of the multitude of source layout blocks A,B. Therefore, the outside border of the CDT graph $G_{CDT}$ may overlap with the perimeter of the source routing plane 210. In other words, the multitude of non-overlapping triangles may include a multitude of vertices each disposed at a different one of a multitude of corners 222, 224 of block A, block B, source routing plane 210 respectively and disposed along at least a different one of a multitude of edges 227 of source routing plane 210.

As will be demonstrated, CDT graph $G_{CDT}$ together with at least one source path P1 are used to record the geometric relationship or correlation between blocks and routing channels via the intersections of the CDT edges and the routing channels or at least one source path P1. CDT graph $G_{CDT}$ for the example depicted in FIGS. 2A-3A may in part be characterized by the total number of vertices in the CDT graph $G_{CDT}$, which is $|V_{CDT}|=16$, and further characterized by the total number of holes, which is $|H|=2$, i.e. blocks A and B.

Figure 2C:
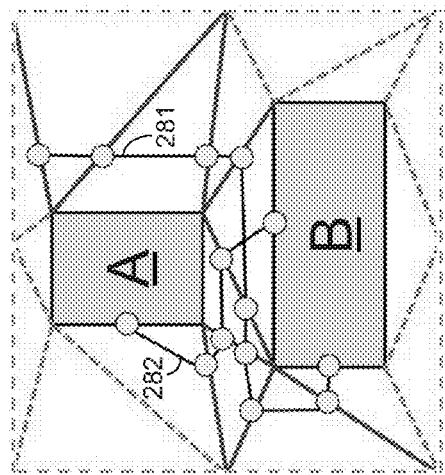

FIG. 2C depicts a multitude of exemplary CDT crossing edges 240 associated with source routing path P1 depicted in FIG. 2B, in accordance with one embodiment of the present invention. The multitude of CDT edges 220, $E_{CDT}$ that are crossing or intersecting with source path P1 may be identified as a multitude of CDT crossing edges 240, which are depicted as thin solid lines in FIG. 2C. The multitude of crossing edges 240 may be a subset of the CDT graph $G_{CDT}$ Through the CDT triangulation, the routing plane is divided into a set of non-overlapping triangles with each different one of the multitude of CDT edges 220 representing a geometric relation between the blocks. The path behavior can thus be recorded as an ordered set or multitude of CDT crossing edges 240 being crossed by the at least one source path, P1. In other words, the locations of the multitude of CDT crossing edges 240 is associated with where the source path P1 is located in relationship to the blocks A, B.

Figure 2D:
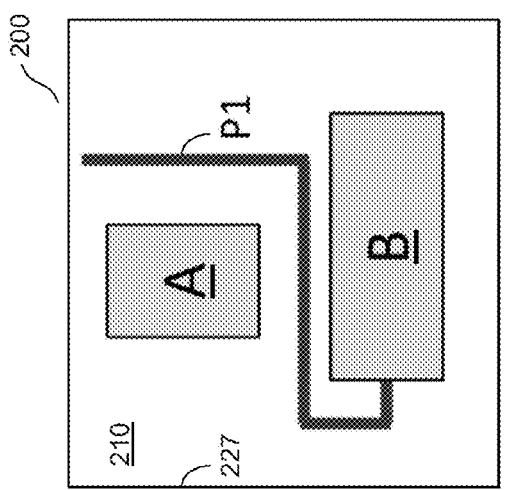

FIG. 2D depicts exemplary crossing points 260 along the source routing path P1 depicted in the reference layout in FIG. 2C and located along a second one of a multitude of source routing paths P2, in accordance with one embodiment of the present invention. Routing path P2 is depicted as a thick line similar to routing path P1. Referring simultaneously with FIG. 2C and FIG. 2D, crossing points 260, depicted as small circles, are identified as the points at the intersections or crossings between the CDT crossing edges 240 and the multitude of source routing paths P1, P2. Therefore, each of the multitude of crossing points 260 may be associated with a different one of the multitude of source routing paths P1, P2. For designs with multiple paths, hereinafter also referred to as "nets" or "channels," a single one of the multitude of CDT crossing edges 240 might be crossed by two or more source routing paths. In this example, the two routing paths, P1 and P2, both pass through the space between blocks A and B with source routing path P2 being generally closer to block A than source routing path P1.

Figure 2E:
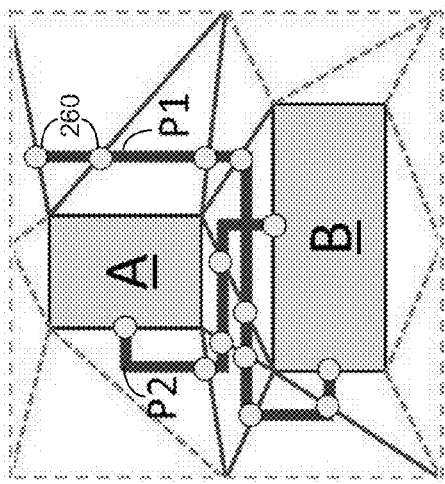

FIG. 2E depicts exemplary storage of routing behavior by the CDT graph $G_{CDT}$ and crossing points 260 depicted in FIG. 2D, in accordance with one embodiment of the present invention. FIG. 2E is similar to FIG. 2D except the multitude of source paths P1, P2 have been replaced by associated respective portions 281, 282 of a crossing graph G described in reference to FIGS. 3A-3C.

FIG. 3A depicts a portion 320 of FIG. 2E, in accordance with one embodiment of the present invention. FIG. 3A is similar to FIG. 2E except FIG. 3A indicates portion 320 depicted as a thick dashed line, which will be described in greater detail below.

FIG. 3B depicts exemplary crossing direction data, hereinafter also referred to as "reference direction," associated with a subset v of the crossing points a-e, depicted in portion 320 in FIG. 3A, in accordance with one embodiment of the present invention. Let $V_{Cr}$ denote the set of crossing points 260 at the intersections between the multitude of routing paths P1, P2 and the multitude of CDT edges 220 or $E_{CDT}$ depicted as thick lines in FIG. 3B. In FIG. 3B, each vertex v∈$V_{Cr}$ is associated with a portion of crossing graph G 381, 382 (depicted as a thin line) respectively associated further to portions 281, 282 of a crossing graph G depicted in FIG. 2E and to source paths P1, P2 depicted in FIG. 2D. In FIG. 3B, each vertex v∈$V_{Cr}$ is further associated with a crossing direction, i.e. horizontal/vertical (H/V). In other words, transforming the source layout into a PSLG may include storing at least one path direction H, V associated with one of the multitude of crossing points a-e.

For example, the source path P2 is oriented in a vertical direction in the source layout at crossing point "a" located along the portion of crossing graph G 382, which is highlighted with a surrounding dashed line and is associated with source path P2, so crossing point "a" is associated with a vertical (V) crossing direction. Similarly, crossing point "d," located along the portion of crossing graph G 381 and associated with source path P1, is associated with a horizontal (H) crossing direction because source path P1 is oriented in a horizontal direction at crossing point "d." The crossing directions will be used later in a routing reconstruction stage described below. Crossing graph G captures and stores not only the individual routing topology, but also captures the positions of each of the multitude of source paths relative to each other, or preserves the order of paths within each routing channel.

FIG. 3C depicts an exemplary portion of a crossing graph G 310 associated with the subset of the crossing points a-e depicted in FIG. 3B, in accordance with one embodiment of the present invention. Referring simultaneously to FIGS. 3B-3C, portion of crossing graph G 310 is a type of PSLG and includes a multitude of crossing points a-e, a multitude of vertices 361-363 at the ends of crossing edges 340, and portions of the multitude of paths 381-382.

In order to preserve the behavior of multiple nets being routed, crossing graph G of layout L is defined as follows. Let $G_{CDT}$ ($V_{CDT}$, $E_{CDT}$, T, H) denote the CDT graph $G_{CDT}$ of L as described above, and $V_{Cr}$ denotes the set of crossing points 260 between the source routing paths P1, P2 and $E_{CDT}$ 220. For any two points v1, v2 in $V_{CDT}$∪$V_{Cr}$, reusable edge 390 e(v1, v2) of crossing graph G exists if (i) v1 and v2 are on the same CDT edge or (ii) v1 and v2 are adjacent vertices that belong to the same routing path. In other words, a pair of vertices v1, v2 define each different one of the multitude of edges e 390 when the pair of vertices v1, v2 are disposed on the same edge e 390 of one of the multitude of non-overlapping triangles or when the pair of vertices v1, v2 are disposed adjacently on source path 381. The e(v1, v1) resultant reusable edge set is denoted as $E_{Cr}$ and a portion of $E_{Cr}$ is depicted by solid lines marked as elements 390 in FIG. 3C. Then crossing graph G={$V_{CDT}$∪$V_{Cr}$, $E_{CDT}$∪$E_{Cr}$, T, H} is a crossing graph of layout L. Crossing graph G is a superset of CDT graph $G_{CDT}$. In other words, in addition to including CDT graph $G_{CDT}$, crossing graph G further includes $V_{Cr}$ and $E_{Cr}$. Crossing graph G is stored into a database of the layout generator to route other solution layouts based upon the source layout.

FIG. 4A-4D depict exemplary behavior of crossing graph G in response to placement changes, in accordance with one embodiment of the present invention. FIG. 4A depicts an exemplary source crossing graph $G_{CDT}$ 410 including two source blocks A, B, in accordance with one embodiment of the present invention. How crossing graphs are updated to reflect placement and/or block size changes in a solution layout are described next. Once the block placement is changed in the source layout, the coordinates of the corners of the blocks, i.e. the vertices at the corners of the blocks, are changed as well.

FIG. 4B depicts an exemplary updated crossing graph $G'_{CDT}$ 415 in response to block placement changes to the source CDT graph $G_{CDT}$ depicted in FIG. 4A, in accordance with one embodiment of the present invention. Since the locations of the vertices at the corners of the multitude of blocks A, B (and/or the corners of the routing plane) are different from the original crossing graph $G_{CDT}$, an updated crossing graph $G'_{CDT}$ ($V'_{CDT}$, $E'_{CDT}$, T', H') is generated according to the new position and/or size of the placement blocks. The updated crossing graph $G'_{CDT}$ 415 includes the same number of vertices, edges, triangles, and holes as $G_{CDT}$, but with different vertex coordinates. The new positions and/or sizes of the multitude of placement blocks A, B in the solution layout may be generated according to known automated placement software, manual layout editing, or their combination. The resulting updated crossing graph $G'_{CDT}$ 415 may be similar to the original graph 410 except being stretched into a different topology.

Updated crossing graph G'$_{CDT}$ 415 may no longer be a valid CDT graph since its edges and triangles may be distorted from the original source crossing graph G$_{CDT}$ 410 in certain situations, such as when an edge of the CDT might overlap with any of the multitude of placement blocks, which is depicted as a dotted and dashed line at edge 417. Notice that once any edge overlaps with any blocks in crossing graph G'$_{CDT}$ 415, then the correlation is vanished between placement blocks, which in turn means edge 417 may no longer represent a valid routing channel. Such overlapping edges that overlap blocks are set to be invalid to indicate that the routing information stored on this edge is incorrect. Accordingly, the crossing graph G is updated by invalidating crossing points disposed on any invalid edge, such as along edge 417.

For one of the multitude of source paths there may usually be a multitude of associated crossing points that are distributed in association across a multitude of different CDT edges and invalidating one edge usually results in invalidating just one crossing point. Therefore, the remainder of numerous valid crossing points associated with that one path may still provide ample direction to the layout generator for routing that path properly, albeit with slightly less confidence than if all the CDT edges remain valid after updating. Such crossing graph updating reflects placement changing in the solution layout. Alternatively, if there is no overlapping between edges and blocks in G'$_{CDT}$, then there is no loss of routing confidence and routing behavior may be very well preserved even when the block placements and/or block sizes change substantially and in arbitrary fashion.

FIG. 4C depicts an exemplary source CDT graph G$_{CDT}$ 420 associated with another source layout, in accordance with one embodiment of the present invention. Source CDT graph G$_{CDT}$ 420 includes a multitude of crossing point crossing directions 430. Crossing reference direction H is depicted as a small circle enclosing a horizontal dash "-," while crossing reference direction V is depicted as a small circle enclosing a vertical mark "|" The reference or crossing directions stored on crossing points give useful information for reconstructing a source routing path 440 on a solution layout with different placements and/or sizes of blocks. In certain cases, the reference direction should be changed from H to V (or V to H) due to the variation of the slope of an associated CDT edge after the crossing graph is updated to reflect the change in position of the block corners in the solution layout.

A path 440 depicted as a solid line, passes through a channel between the multitude of blocks C, D with a vertical direction or orientation and proceeds in a horizontal direction above block D. There are three crossing points including two with a vertical V reference direction where path 440 is oriented vertically and a top crossing point 430 includes a horizontal direction H where path 440 is oriented horizontally.

FIG. 4D depicts an exemplary updated solution CDT graph G$_{CDT}$ 450 in solution layout associated with the source CDT graph G$_{CDT}$ 420 depicted in FIG. 4C, in accordance with one embodiment of the present invention. Updated CDT graph G$_{CDT}$ 450 includes changed crossing point crossing direction 460. After changing the placement, every CDT edge remains valid, i.e. there is no overlapping with the blocks C, D. However, the direction of the top-most crossing point changes from horizontal reference direction to vertical reference direction due to the change in the orientation of the associated CDT edge changing from horizontal to vertical. If such a CDT edge orientation change as described above occurs after updating the CDT graph G$_{CDT}$ in the solution layout, then the reference direction will be changed accordingly from H to V.

Figure 5C:
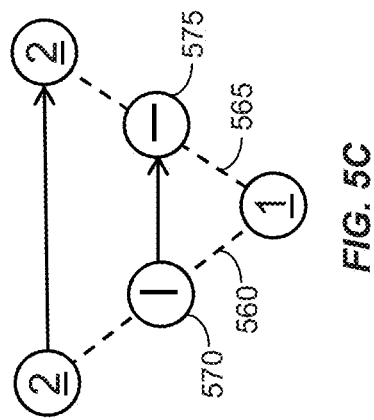
FIG. 5A-5C depict exemplary generalized crossing direction response to placement changes for two cases, in accordance with one embodiment of the present invention.
Figure 5B:
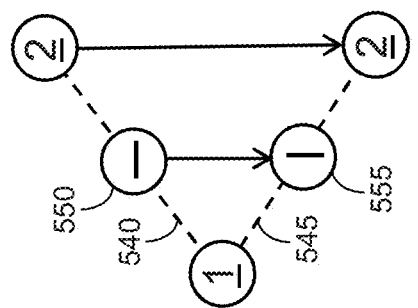
Figure 5A:
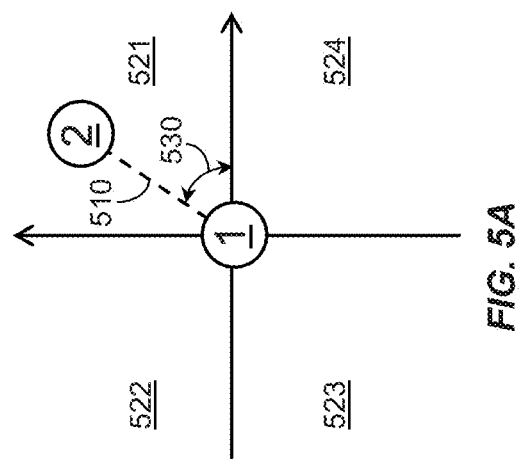

FIG. 5A-5C depict exemplary generalized crossing direction response to placement changes for two cases, in accordance with one embodiment of the present invention. FIG. 5A depicts an exemplary reference frame, in accordance with one embodiment of the present invention, including a CDT edge e 510 including two endpoints, vertex 1 and vertex 2. Without loss of generality, let vertex 1 be identified as a coordinate origin, at the center of the reference frame, which includes four quadrants; 521, 522, 523, 524 corresponding to angle 530 of CDT edge e 510 having an angle between the ranges of 0-0.5π, 0.5π-π, −0.5π−−π, and 0−−0.5π, respectively.

FIG. 5B depicts a first case of generalized crossing direction response to placement changes between a source layout and a solution layout, in accordance with one embodiment of the present invention. Let G$_{CDT}$ be associated with a source layout and G'$_{CDT}$ be associated with a solution layout. Referring simultaneously to FIGS. 5A-5B, when angle 530 of CDT edge e 540 in G$_{CDT}$ is in the range of (0, 0.5π, 0) and if angle 530 of e 545 in G'$_{CDT}$ is in the range of (−π, −0.5π, 0), then crossing points 550 on CDT edge e 540 with reference direction H will change their reference directions to V at updated crossing points 555 and vice-versa.

FIG. 5C depicts a second case of generalized crossing direction response to placement changes, in accordance with one embodiment of the present invention. If the angle 530 of CDT edge e 560 in G$_{CDT}$ is in the range of (−0.5π, −π, 0.5π) and if angle 530 of CDT edge e 565 in G'$_{CDT}$ is in the range of (−0.5π, 0, 0.5π), then crossing points 570 with reference direction V will change their reference directions at updated crossing points 575 from V to H, and vice versa. With this process, the reference directions may be correctly updated.

Figure 6:
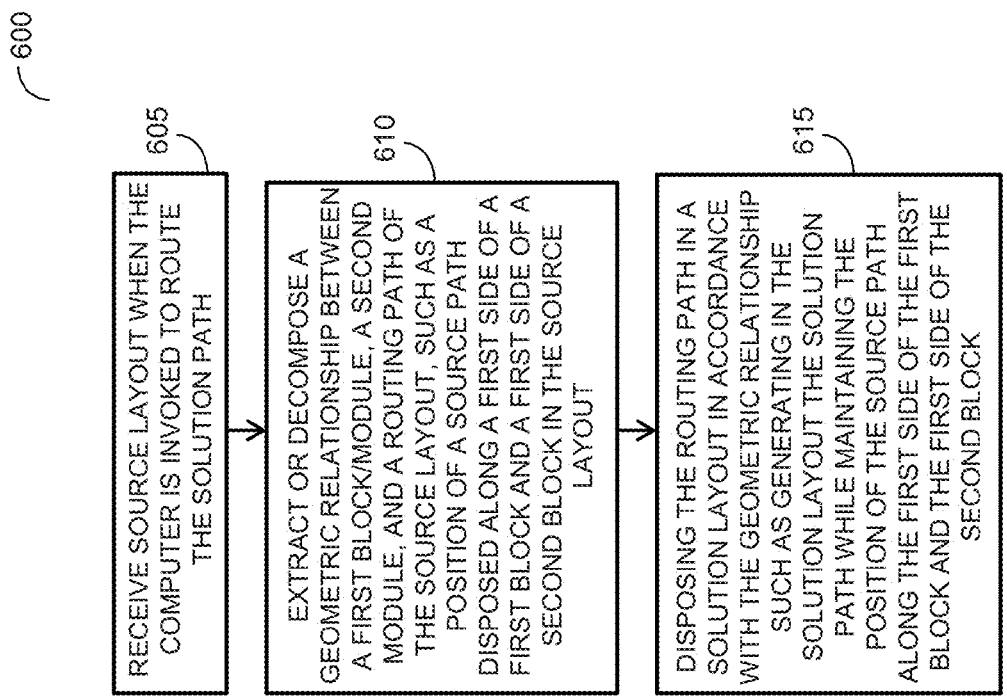
FIG. 6 depicts an exemplary generalized flow chart for generating a solution layout using routing preservation, in accordance with one embodiment of the present invention.

FIG. 6 depicts a simplified exemplary computer implemented flow chart 600 for routing a solution path using routing preservation, in accordance with one embodiment of the present invention. Referring simultaneously to FIGS. 1A, 1C, and FIG. 6, the method includes receiving 605 a source layout 100A when the computer is invoked to route the solution path 130. The method further includes extracting or decomposing 610 a geometric relationship between a first block/module A, a second module C, and a routing path 110 of the source layout, such as a position of a source path 110 disposed along a first side 127 of a first block A and a first side 129 of a second block C in source layout 100A.

The geometric relationship of the routing path is saved or preserved in the crossing graph representation, which is a type of PSLG as described above, which preserves analog electrical characteristics associated with the source layout when the path routing is transferred to the solution layout using the crossing graph representation. The crossing graph G may be generated using the multitude of non-overlapping triangles in the G$_{CDT}$ that are geometrically associated with the first module A, the second module B, and the routing path P1 described above in reference to FIGS. 2A-3C.

Referring again to FIG. 6, flow chart 600 further includes disposing 615 routing path 130 in a solution layout 100C in accordance with the geometric relationship, e.g. which is saved in the crossing graph representation, such as generating 615 in solution layout 100C the solution path 130 while maintaining the position of the source path 110 along the first side of the first block and the first side of the second block using the geometric relationship information preserved in the crossing graph G.

Figure 7:
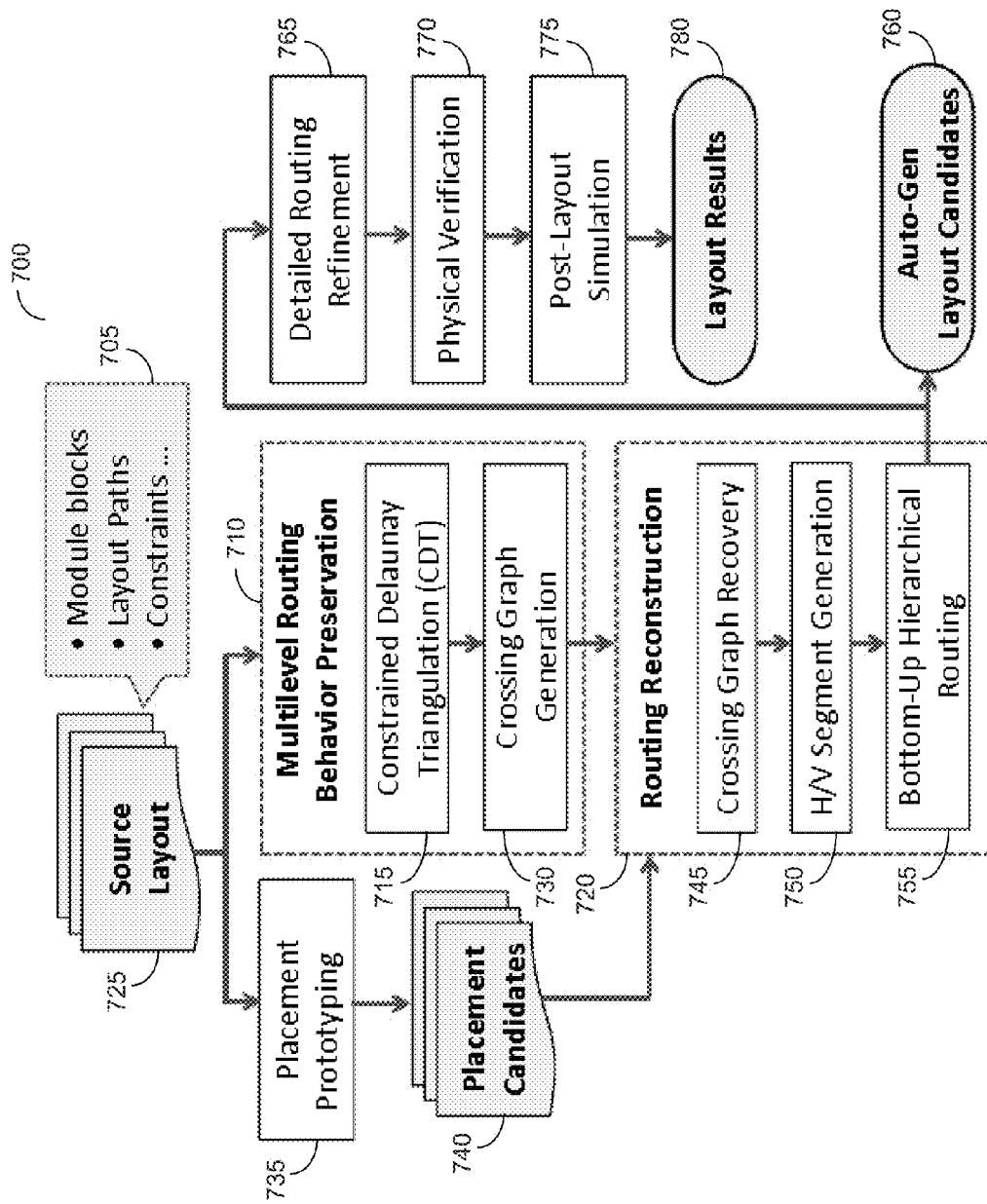
FIG. 7 depicts a more detailed flow chart of the flow chart depicted in FIG. 6, in accordance with one embodiment of the present invention.

FIG. 7 depicts a more detailed flow chart 700 of the flow chart 600 depicted in FIG. 6, in accordance with one embodiment of the present invention. Flow chart 700 may include two stages: multilevel routing behavior preservation 710, hereinafter also referred to as the "preservation," followed by routing reconstruction 720 corresponding respectively to steps 610, 620 described above in reference to FIG. 6. The layout extraction and routing preservation technique described above may be applied to generalized flattened layout. Generally, analog design follows hierarchical design concepts that produce structured design. Hence, the layout generator provides multilevel analog routing design for generating solution layout prototypes, which will be described later in greater detail in reference to FIGS. 8A-8F.

Referring to FIG. 7, preservation 710 includes applying 715 the CDT algorithm to divide the routing plane in source layout 725 into non-overlapping triangles as described above in reference to FIG. 2B. Source layout 725 may include 705 a multitude of modules or blocks, a multitude of layout paths, channels, or nets, and a multitude of constraints, which may include symmetry and proximity constraints used during hierarchical routing preservation. Next, a multilevel layout preservation scheme is provided by constructing or generating 730 a set of crossing graphs G hierarchically as described above in reference to FIGS. 2C-3C. In one embodiment, generating 730 the crossing graph step may further include storing a path direction associated with each different one of the multitude of points as described above in reference to FIGS. 4C-5C.

Referring to FIG. 7, a known placement prototyping technique is used 735 on source layout 725 to obtain 740 multiple solution layout placement candidate results prior to solution path routing at routing reconstruction 720. In routing reconstruction 720 stage of the layout generator, routing is generated on each of the placement results automatically by a bottom-up technique described below.

Routing reconstruction 720 includes updating or recovering 745 the crossing graph based on the new block placements given in the solution layout. In other words, disposing the routing path in the solution layout further includes updating the planar straight-line graph, e.g. recovering 745 the crossing graph G, in accordance with the solution layout, i.e. in accordance with the new positions and/or shapes of the multitude of blocks, such as the new corners and associated vertices of the first and second blocks, in the solution layout as described above in reference to FIGS. 4A-4B. In one embodiment, recovering the PSLG or crossing graph G includes repositioning each of the multitude of vertices associated with the different ones of the multitude of corners of the blocks when at least one of the multitude of corners is repositioned in the solution layout.

Referring to FIG. 7, routing reconstruction 720 further includes generating 750 a multitude of segments of a solution path in accordance with the multitude of crossing points of the recovered PSLG or crossing graph as described above in reference to FIGS. 2E-4B. Referring to FIG. 7 in one embodiment, generating 750 the multitude of segments may be done in accordance with the multitude of reference directions H, V associated with each different one of the multitude of crossing points as described above in reference to FIGS. 4C-5C. In one embodiment, generating a multitude of segments is in accordance with at least one path reference direction H, V.

Referring to FIG. 7 next, each of the multitude of segments that are associated with a path are included in the solution path for each of the multitude of paths to be reconstructed in the solution layout via a bottom-up hierarchical routing 755 that produces the automatically-generated 760 solution layout candidates for each of the provided placement candidates 740. At the end of the reconstruction stage, a set of solution layouts without refinement is obtained, which provides designers a quick look at possible solutions that may be used. Alternatively, after bottom-up hierarchical routing 755, a detailed routing refinement may be applied 765 manually to route the un-routed nets before final physical verification 770 and post-layout simulation 775 to produce the final layout results 780. Portions of the detailed flow chart 700 may be iteratively repeated (not shown) at various steps during the design procedure.

FIG. 8A-8F depict exemplary multilevel crossing graph generation, in accordance with embodiments of the present invention. Generally, analog design follows hierarchical design concepts that produce structured design. Hence, the layout generator is extended to include multilevel analog design for prototyping described as follows. In order to reduce routing mismatches between the source and solution layout routing, block symmetry and block proximity constraints are considered for both placement and routing. For the given source layout, modules/devices/blocks are grouped as clusters or clustered in accordance with the symmetry and proximity constraints, where the constraints can be either given by designers or extracted from the source layout as is known.

Figure 8A:
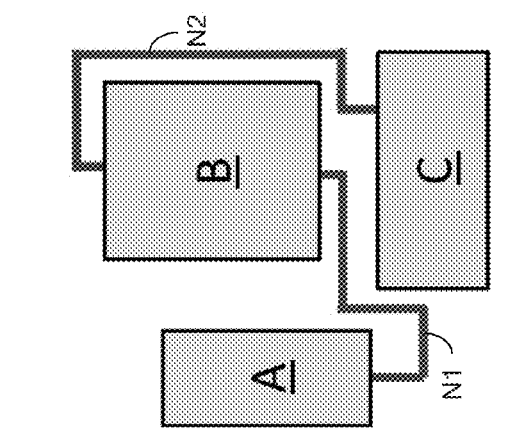

FIG. 8A depicts an exemplary source layout including three blocks A, B, C and two paths N1, N2, which may be used with embodiments of the present invention. FIG. 8B depicts an exemplary hierarchical division of the source layout depicted in FIG. 8A, in accordance with one embodiment of the present invention. For each cluster, the routing behavior and correlation with placement blocks are analyzed based on the CDT of that cluster to build a corresponding crossing graph. Crossing graphs of clusters are constructed bottom-up along the hierarchical structure. Bottom-level clusters are regarded as placement blocks in upper-level clusters. Consequently, a series of crossing graphs are generated which contain the routing behavior hierarchically.

The hierarchical division includes cluster M corresponding to a bottom level cluster, and cluster U corresponding to an upper level cluster. In this embodiment, block B and C are grouped into cluster M, and cluster M and block A are grouped into cluster U. According to the hierarchy, two crossing graphs are constructed with respect to cluster M and U respectively, and each routing path is divided into i) intra-cluster connections and ii) inter-cluster connections.

Figure 8C:
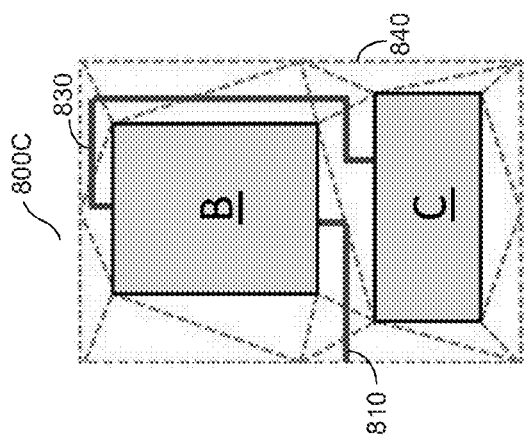
FIG. 8C depicts a CDT graph for a bottom level cluster, in accordance with one embodiment of the present invention.
Figure 8E:
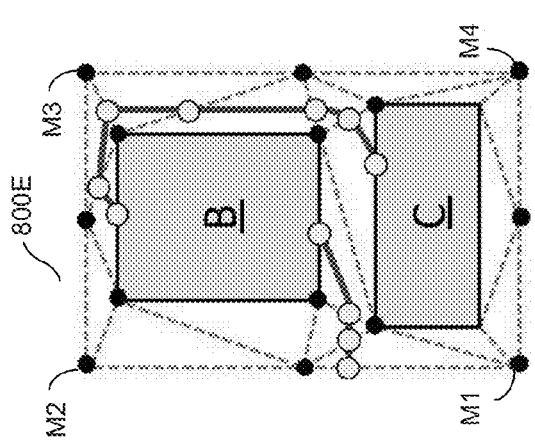
FIG. 8E depicts a CDT crossing graph for the bottom level cluster depicted in FIG. 8C, in accordance with one embodiment of the present invention.
Figure 8B:
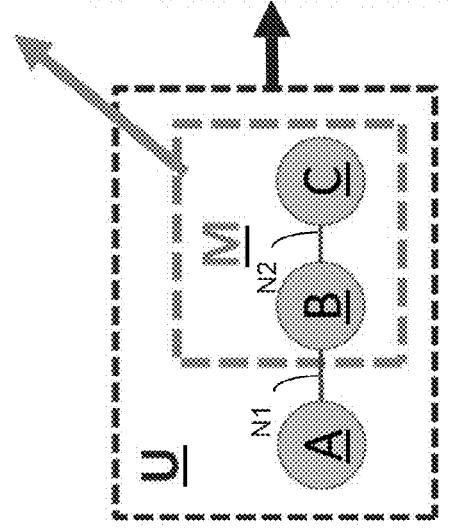
FIG. 8B depicts an exemplary hierarchical division of the source layout depicted in FIG. 8A, in accordance with one embodiment of the present invention.
Figure 8D:
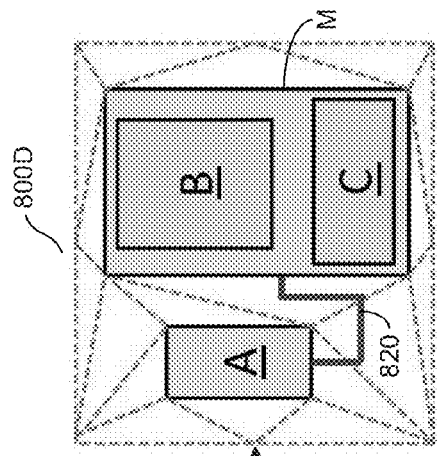
FIG. 8D depicts a CDT graph for an upper level cluster, in accordance with one embodiment of the present invention.

FIG. 8C depicts a CDT graph 800C for a bottom level cluster M, in accordance with one embodiment of the present invention. FIG. 8D depicts a CDT graph 800D for an upper level cluster U, in accordance with one embodiment of the present invention. Cluster M is included as a placement block in CDT graph 800D. Referring simultaneously to FIGS. 8A-8D, path N1 is segmented into inside parts 810 and outside parts 820 with respect to cluster M. FIG. 8E depicts a CDT crossing graph 800E for the bottom level cluster M depicted in FIG. 8C, in accordance with one embodiment of the present invention. CDT crossing graph 800E includes vertices M1-M4 associated with the corners defining the borders of cluster M.

Figure 8F:
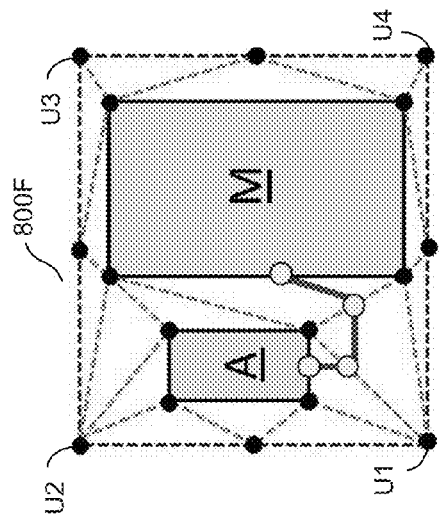
FIG. 8F depicts a CDT crossing graph for an upper level cluster depicted in FIG. 8D, in accordance with one embodiment of the present invention.

FIG. 8F depicts a CDT crossing graph 800F for the upper level cluster U depicted in FIG. 8D, in accordance with one embodiment of the present invention. CDT crossing graph 800F includes vertices U1-U4 associated with the corners defining the borders of cluster U. Therefore the crossing points of path N1 appear in both of the two CDT crossing graphs 800E, 800F. On the other hand, since path N2 contains only intra cluster connection 830 in cluster M, the corresponding crossing points are all inside a single CDT crossing graph 800E. In other words, a position of source path N1 may be extracted from the source layout from along the first side of first block B and a first side of block A after extracting the position of the source path disposed along the first side of block B and the first side of block C thereby hierarchically extracting the position of source path N1, where crossing graph data associated with block B and block C are clustered on a lower hierarchical level, while crossing graph data associated with block A is placed on a higher hierarchical level.

In one embodiment, bottom-up routing reconstruction is described as follows. The set of placement results are obtained by the extending DeFer as is known but using the same hierarchical structure described in the embodiments above. For each placement result, routing may be reconstructed as follows.

The crossing graph is updated. In order to obtain routing in the target placement with the similar behavior as the source layout, the crossing graph G of each cluster is updated into a new placement by the embodiments described above. In other words, the solution path may be generated in the solution layout while maintaining the source path along the first side of the first block B and the first side of block A.

Wires or paths are reconnected by orthogonal segments. For each cluster i of the input reference design, the routing paths are re-constructed according to the corresponding crossing graph $G_i$. Recall that each crossing point $v \in V_{Cr}$ in $G_i$ includes a reference direction stored on that crossing point. For each $G_i$, the orthogonal wire segments are generated as follows. First, i) adjacent crossing points with the same reference direction are aligned to produce a set of vertical/horizontal segments. Next ii), if the previous step does not produce illegal routing such as crossing with other modules/devices/blocks, the segment will be preserved, else iii) the program will split the segment into several sub-segments with each sub-segment adapted to be routed using the reference direction legally, and then these sub-segments are connected using pattern routing. Then, iv) the wire spacing constraints of each metal layer are examined and adjusted by shifting segments.

In one embodiment, bottom-up hierarchical routing is described as follows. Once the routing reconnection of all the bottom level clusters are complete, these bottom level clusters are regarded as placement blocks in the upper level clusters, and the wire segments connected to the block boundary are taken as pin locations in the upper level clusters. The procedure is repeated until the top-level design of the routing is obtained. In other words, the solution path in the solution layout may be generated while maintaining the source path along the first side of block B and the first side of block A.

Since the above routing preservation steps are performed automatically, each net may still benefit by being patched or refined in detail by the designer. In the case of prototyping, since the technology remains the same with the source layout, the inner device routing can be obtained by reusing the routing of the source layout with slight manual refinement. In the process migration application, the pin connections inside the devices/blocks may be done manually since the locations inside each devices/blocks are changed from the source layout to the target technology. However, since the routing reconstruction scheme is provided in a comprehensive way, most of the tasks are already covered and the detailed refinement may be easier to implement for the analog layout designers than using known techniques.

The layout generator for prototyping was experimentally implemented in c++ language on an Intel® 5420 Quad Core 2.5 GHz machine under the Linux CentOS 5.8 platform. OpenAccess v22.04p54 was applied for extracting industrial designs. Synopsys PyCell Studio™ was used for layout generation. Two experimental circuits were used as reference layouts: i) a folded-cascode operational amplifier (OpAmp) design, and ii) a variable-gained amplifier (VGA) under wafer foundry A's 90 nm processing. Table 2 shows the specification of the source layout experimental circuits.

TABLE 2

| Circuit | OpAmp | VGA |
| --- | --- | --- |
| Technology | A90 nm | A90 nm |
| Vdd | 1 V | 1.1 V |
| Load Capacitance | 200 pF | 1.5 pF |
| Gain | ≥48.653 dB | ≥18.48 dB |
| Gain Bandwidth | ≥100 MHz | ≥5 MHz |
| Phase Margin | ≥45 deg | ≥45 deg |
| Area | 832.66 µm² | 10889.88 µm² |

The layout generator for prototyping was used to generate layout for different types of technologies as described below. Later, fast multiple layout topology generation was performed. The overall layout generation flow generally consists of device/block sizing, placement and path routing construction. In these experiments, all the sizes of devices/blocks in the targeted technologies are decided, and the hierarchical placement results are obtained using know techniques under wafer foundry A's 90 nm and wafer foundry A's 65 nm technologies. All the experimental results have passed layout verification via design rule check (DRC), layout versus schematic (LVS) checks, and the simulation data is listed in Tables 3A-3B and Table 4. Tables 3A-3B shows routing completeness and performance comparisons between migration targets. Table 4 shows routing completeness and performance comparisons between multiple topologies.

TABLE 3A

| Circuit | Technology | Layout | RtWL[a] (µm) | AWL[b] (µm) | RtCom[c] | $A_v$ (dB) |
| --- | --- | --- | --- | --- | --- | --- |
| OpAmp | A90 nm | MR[f] | 351.438 | — | — | 48.653 |
|  | A65 nm | MR | 321.44 | — | — | 43.421 |
|  | A65 nm | NAR[g] | 414.84 | 312.471 | 75.3% | 43.02 |
|  | A65 nm | RR[h] | 298.99 | 231.15 | 77.3% | 43.425 |
|  | B90 nm | RR | 286.954 | 215.204 | 74.99% | 45.43 |
| VGA | A90 nm | MR | 3628.25 | — | — | 18.48 |
|  | A65 nm | MR | 3011.83 | — | — | 18.57 |
|  | A65 nm | RR | 3385.849 | 2877.99 | 85% | 18.56 |

TABLE 3B

| Circuit | Technology | Layout | BW[d] (MHz) | PM[e] (deg) | Power (µW) | Design time[i] |
| --- | --- | --- | --- | --- | --- | --- |
| OpAmp | A90 nm | MR[f] | 110.9 | 45.882 | 120.34 | 8 hrs |
|  | A65 nm | MR | 110.4 | 53.294 | 118.66 | 8 hrs |
|  | A65 nm | NAR[g] | 108.6 | 56.6 | 118.36 | 100 mins |
|  | A65 nm | RR[h] | 110.37 | 52.58 | 118.65 | 30 mins |
|  | B90 nm | RR | 120.4 | 53.067 | 114.96 | 30 mins |
| VGA | A90 nm | MR | 7.237 | 86.645 | 596.74 | 2 days |
|  | A65 nm | MR | 7.427 | 90.75 | 566.81 | 2 days |
|  | A65 nm | RR | 7.401 | 88.1 | 565.54 | 6 hrs |

Notes for Tables 3A-3B are described as follows. a) Total wire length of routing. b) Auto generated wire length. c) Routing completeness is the ratio between AWL and RtWL. d) Bandwidth of circuit. e) Phase margin of circuit. f) Manual routing style. g) Non-preserved automatic routing style by known methods. h) Routing-preserved reconstruction style by the layout generator embodiment. i) Design time for each routing strategy includes routing construction, detailed routing refinement and physical verification as a complete layout generation process.

TABLE 4

| Circuit | Layout | RtWL (μm) | AWL (μm) | RtCom | $A_v$ (dB) | BW (MHz) | PM (deg) | Design time |
|---|---|---|---|---|---|---|---|---|
| Topo2 | MR | 210.53 | — | — | 43.398 | 111.22 | 53.723 | 3 hrs |
| | NAR | 355.625 | 270.53 | 76% | 42.69 | 112.8 | 57.57 | 60 mins |
| | RR | 257.569 | 204.176 | 79.27% | 43.4 | 108.5 | 50.5 | 30 mins |
| Topo3 | MR | 203.204 | — | — | 43.398 | 110.63 | 53.601 | 3 hrs |
| | NAR | 392.777 | 311.2 | 79.23% | 42.99 | 109.3 | 57.35 | 40 mins |
| | RR | 278.023 | 232.866 | 83.7% | 43.4 | 109.9 | 55.6 | 20 mins |
| Topo4 | MR | 206.625 | — | — | 43.41 | 111 | 53.669 | 3 hrs |
| | NAR | 486.795 | 369.3 | 75.86% | 43.03 | 108.2 | 57.3 | 35 mins |
| | RR | 307.136 | 280.72 | 91.4% | 43.4 | 109 | 51 | 17 mins |
| Topo5 | MR | 228.519 | — | — | 43.393 | 111 | 53.617 | 3 hrs |
| | NAR | 395.9 | 316.6 | 79.97% | 42.74 | 108.7 | 57.71 | 1 hrs |
| | RR | 255.039 | 218.624 | 85.7% | 43.4 | 110 | 54.8 | 25 mins |
| Topo6 | MR | 274.525 | — | — | 43.393 | 110.56 | 53.496 | 3 hrs |
| | NAR | 408.7 | 316.8 | 77.51% | 42.75 | 108.8 | 57.34 | 65 mins |
| | RR | 291.645 | 249.964 | 85.7% | 43.4 | 110 | 54.2 | 20 mins |
| Topo7 | MR | 226.495 | — | — | 43.398 | 111.59 | 53.917 | 3 hrs |
| | NAR | 406.55 | 298.1 | 73.32% | 42.98 | 109.6 | 57.7 | 43 mins |
| | RR | 235.406 | 191.538 | 81.4% | 43.386 | 110.43 | 56.4 | 15 mins |
| Tapo8 | MR | 238.28 | — | — | 43.422 | 110.98 | 53.412 | 3 hrs |
| | NAR | 435.555 | 334.7 | 76.84% | 42.77 | 108.7 | 57.54 | 45 mins |
| | RR | 265.898 | 238.07 | 89.5% | 43.41 | 110.44 | 56 | 18 mins |

FIGS. 9A-9D depict screen shots of a graphical user interface (GUI) showing exemplary experimental crossing graph results of embodiments of the present invention applied to two different circuits before and after updating. The design migration application was exercised by migrating two circuits based on wafer foundry A's 90 nm technology to other technology nodes which are wafer foundry A's 65 nm and wafer foundry B's 90 nm. Table 2 gives the specifications of each circuit. To meet the requirements of design migration, one circuit should be re-generated on the target technology with the same functionality while satisfying the performance specification. CDT non-overlapping triangles are clearly discernable by their vertices being located at block corners, while nets are discernable by crossing the CDT triangle edges and having long portions running parallel to edges of blocks and located generally between the blocks.

Figure 9B:
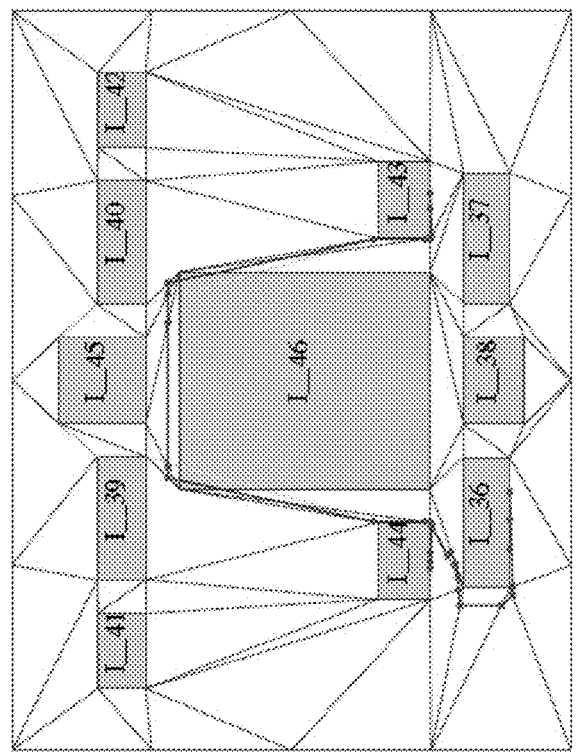
FIGS. 9A-9D depict screen shots of a graphical user interface (GUI) showing exemplary experimental crossing graph results of embodiments of the present invention applied to two different circuits before and after updating.
Figure 9A:
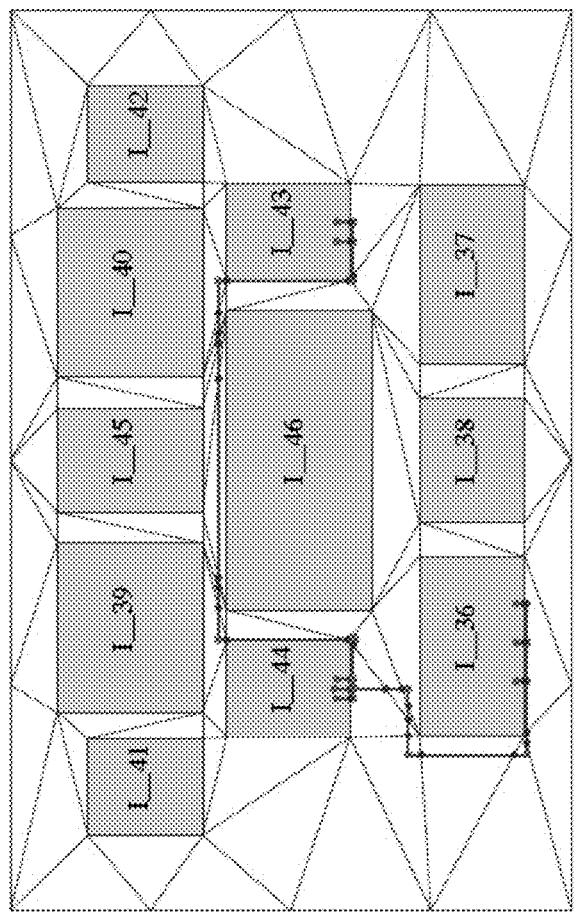

FIG. 9A depicts exemplary experimental crossing graph results of embodiments of the present invention applied to an extracted OpAmp circuit under wafer foundry A's 90 nm processing before updating with only one routing path being displayed.

FIG. 9B depicts exemplary experimental crossing graph results of embodiments of the present invention applied to an OpAmp circuit under wafer foundry B's 90 nm processing after updating from the experimental results depicted in FIG. 9A. It is observed that the routing behavior is recorded by the crossing graph when the placement is changed.

Figure 9C:
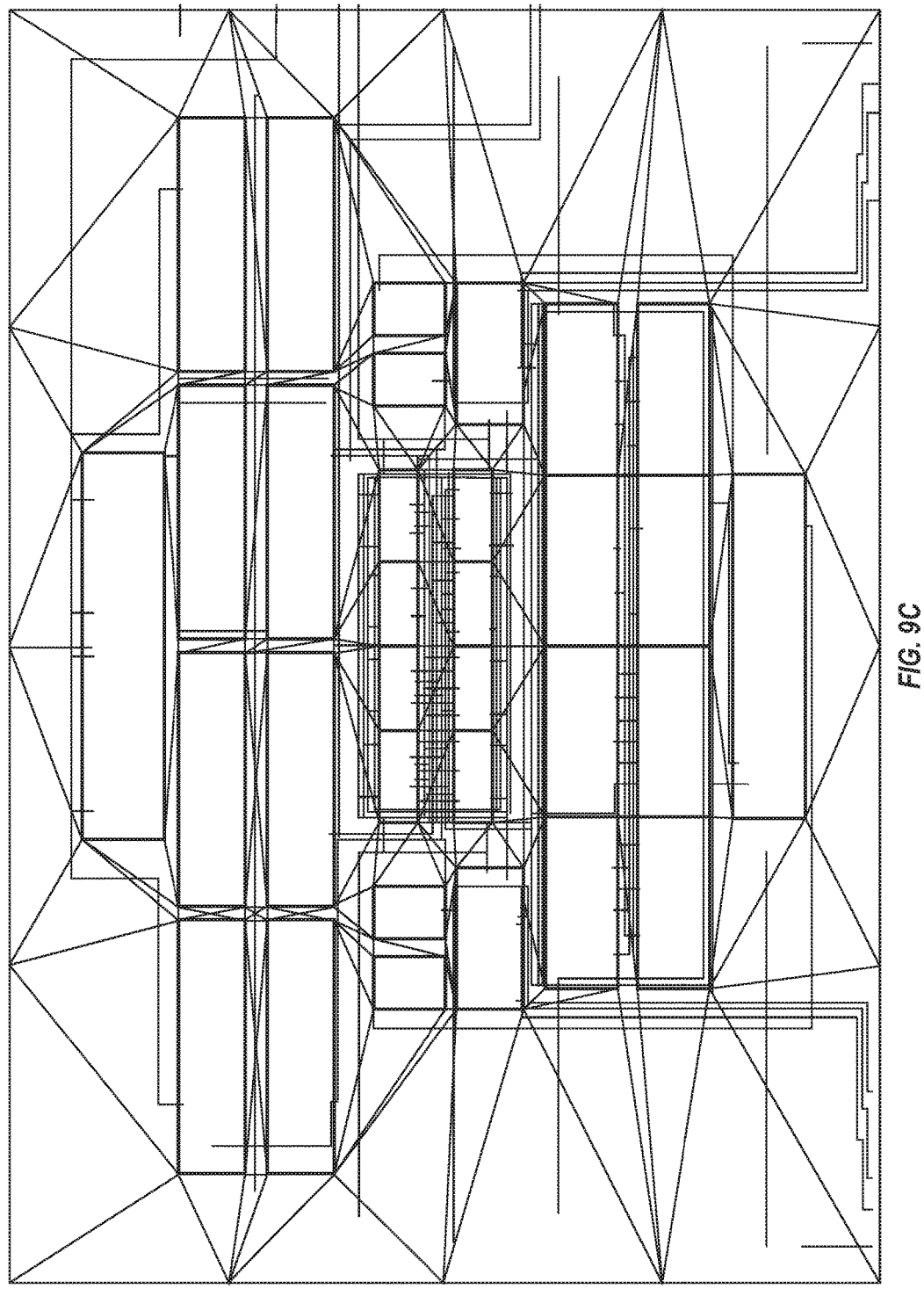

FIG. 9C depicts exemplary experimental crossing graph results of embodiments of the present invention applied to an extracted VGA circuit under wafer foundry A's 90 nm processing before updating. The VGA has more than one hierarchy with all routing paths on it.

Figure 9D:
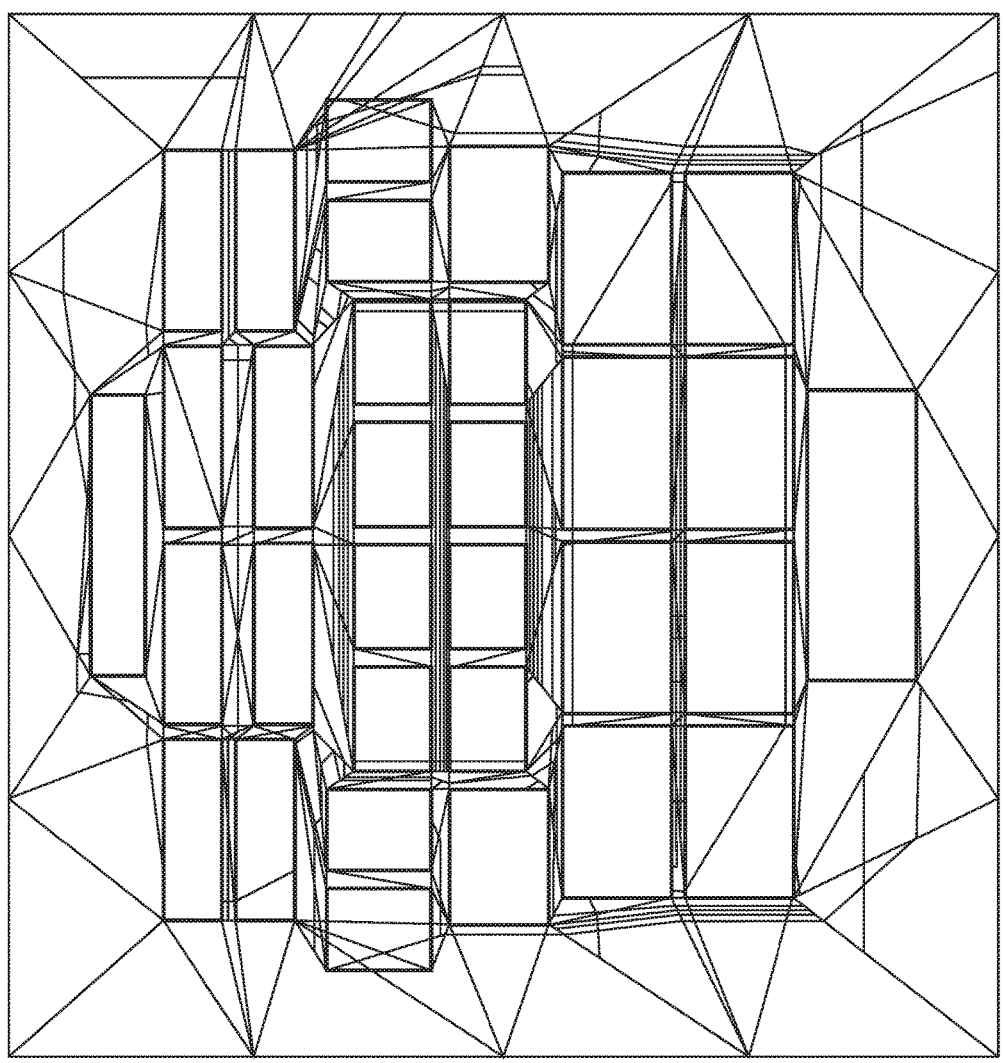

FIG. 9D depicts exemplary experimental crossing graph results of embodiments of the present invention applied to a VGA circuit under wafer foundry A's 65 nm processing after updating from the experimental results depicted in FIG. 9C. Although the VGA circuit has many more routing nets than the OpAmp circuit, the routing behavior of each routing paths is preserved in the crossing graph.

Figure 10B:
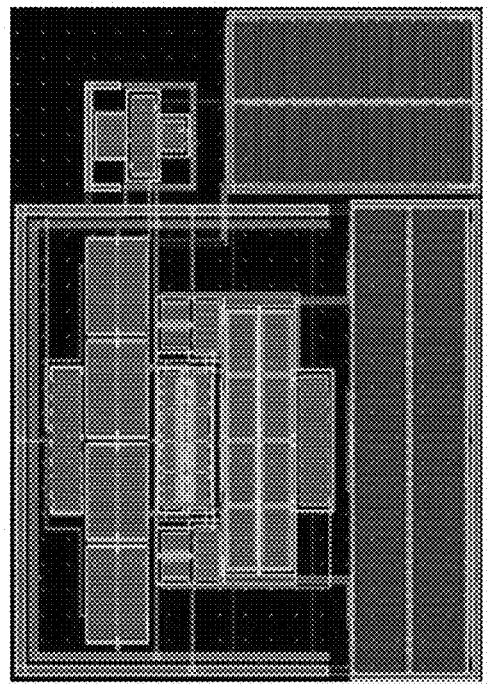
FIGS. 10A-10D depict screen shots of a graphical user interface (GUI) showing exemplary experimental layout results of embodiments of the present invention applied to two different circuits before and after migrating.
Figure 10D:
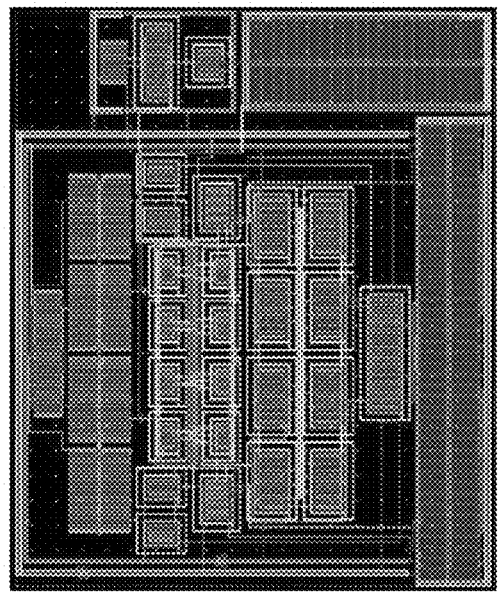
Figure 10A:
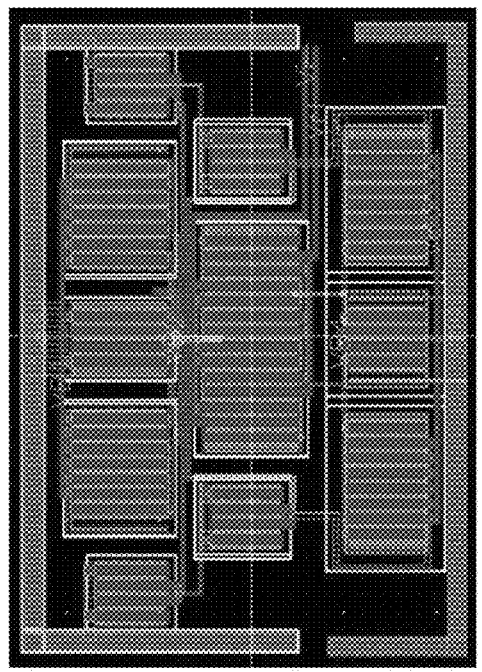

FIGS. 10A-10D depict screen shots of a graphical user interface (GUI) showing exemplary experimental layout results of embodiments of the present invention applied to two different circuits before and after migrating. FIG. 10A depicts exemplary experimental layout results for an OpAmp circuit under wafer foundry A's 90 nm processing using manual routing on the source layout.

Figure 10C:
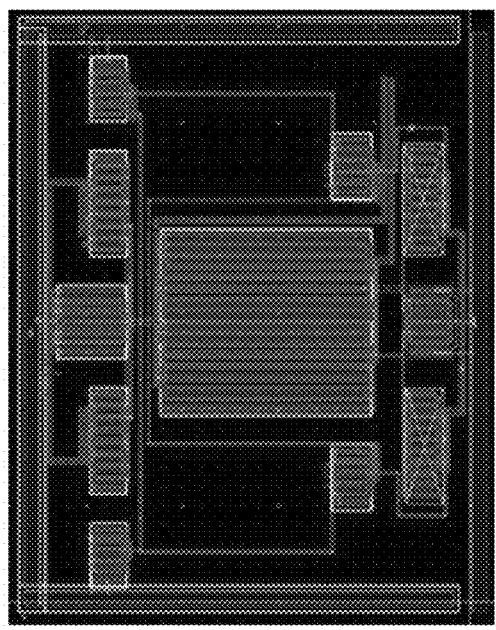
Figure 11D:
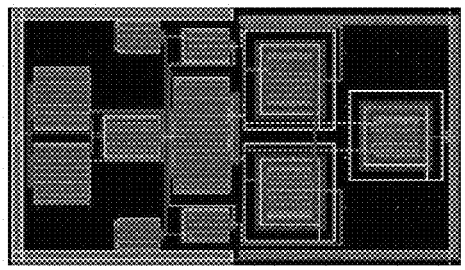
FIGS. 11A-11G depict screen shots of a graphical user interface (GUI) showing exemplary experimental layout results of embodiments of the present invention applied to the OpAmp circuit under wafer foundry A's 65 nm processing for seven different placement topologies, respectively.
Figure 11C:
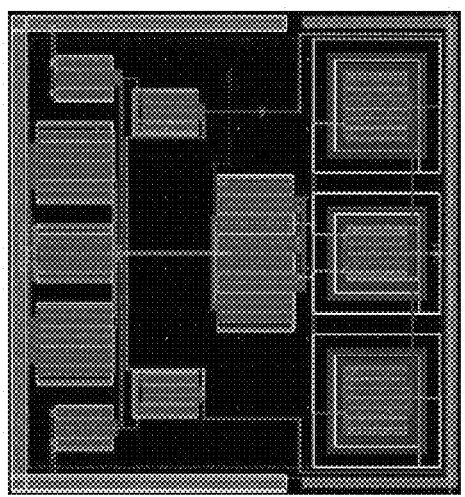
Figure 11B:
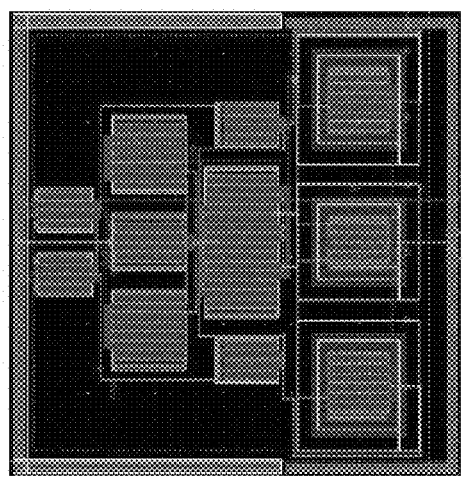
Figure 11A:
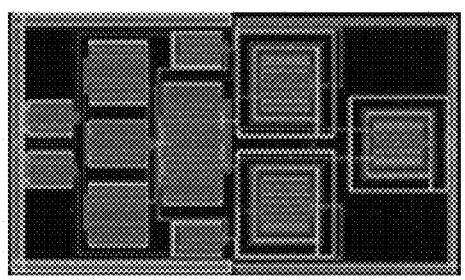
Figure 11G:
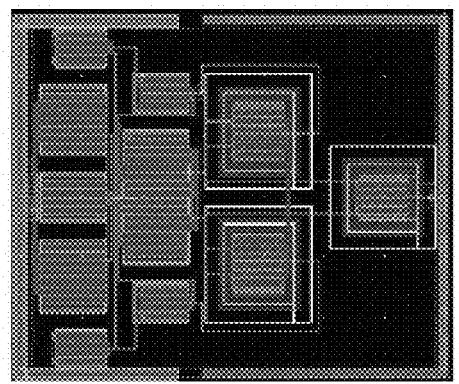
Figure 11F:
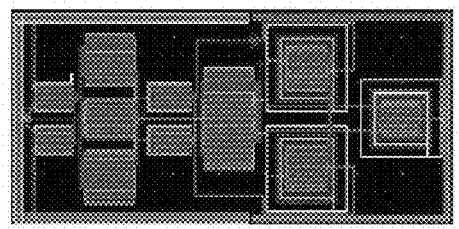
Figure 11E:
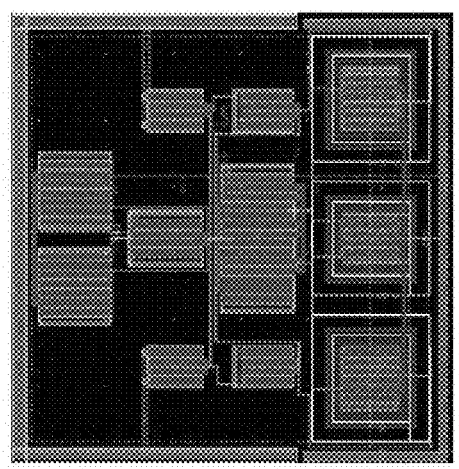

FIG. 10B depicts exemplary experimental layout results for a VGA circuit under wafer foundry A's 90 nm processing using manual routing on the source layout. FIG. 10C depicts exemplary experimental layout results of embodiments of the present invention applied to the OpAmp circuit under wafer foundry B's 90 nm processing by migrating the design using the layout generator. It is easy to observe that the routing correlation with placement is preserved under wafer foundry B's 90 nm technology. Due to the sizing strategy for optimizing performance, the size of each device is visibly different compared to the source layout.

FIG. 10D depicts exemplary experimental layout results of embodiments of the present invention applied to the VGA circuit under wafer foundry A's 65 nm processing by migrating the design using the layout generator. Since there are three common-centroid structures in the VGA layout, more wires are connected inside these common-centroid structures. While manual routing takes time to re-construct the routing, the crossing graph preserves the relative locations for these wires.

The results of the layout generator according to the embodiments of the present invention are compared with manual routing and one automatic routing engine without reference. The comparing targets are listed as follows. MR as manual route style by the layout designer. NAR as non-preserved automatic routing, where one automatic routing engine is applied which simply connects wires from netlist information according to the usual analog constraints such as symmetry and proximity. RR as routing-preserved reconstruction, according to the extracted CDT, the layout is re-constructed by transferring the reference layout associations between block placements and paths.

The above three routing strategies are performed upon the OpAmp and VGA designs under different technologies. Table 3 records the wire length and simulation data. Comparisons are made of the total routing wire length (RtWL), automatically generated wire length (AWL) and the routing completeness (RtCom). Relating to MR strategy, the RtWL implies the overall routing wire length produced by the analog layout designers. Since circuit sizing in wafer foundry A's 65 nm can be scaled down to satisfy performance specifications, the devices' size and RtWL are proportionally smaller as well. The routing completeness is expressed as the ratio between auto-generated routing over total wire length. The overall wire length consists of routing by manual route and program routing. Even though NAR generate routing result automatically, it still takes time to refine the layout for accuracy. In the OpAmp circuit, most of the NAR results have failed with LVS checking so that it leaves part of wire routing to manual refinement.

On average, RR obtains more than 75% RtCom in the OpAmp case and 85% RtCom in the VGA case. The more RtCom for routing, the less wire needed to be refined for an accurate layout. The design time for these routing strategies includes routing generation, detailed routing refinement and physical verification as a complete layout generation flow. MR takes most of the time due to manual layout design. On the other hand, NAR and RR apply routing algorithms to automatically generate a rough routing result. Therefore, significant differentiation among manual routing and automatic routing via design time comparison is observed. In the OpAmp case, both wafer foundry A's 90 nm and 65 nm take 8 hrs to complete the routing, and the VGA takes 2 days for MR in both technologies. NAR is faster than MR with 100 minutes design time. Other than MR and NAR, RR only takes 30 minutes to obtain the complete layout. As a result, RR demonstrates efficient design cycle time and effectiveness for meeting the circuit performance requirement.

The performance for Voltage gain (Av) is compared, band width (BW), phase margin (PM), power consumption (Power) and design time are shown in the right part of Table 3. In OpAmp case, MR earns first place for voltage gain Av. However, RR obtains better Av than the others under wafer foundry A's 65 nm. Meanwhile, the layout generator method also acquires better performance for Av, BW and Power under wafer foundry B's 90 nm processing. In VGA case, the MR and RR for migration is compared under wafer foundry A's 65 nm, and RR obtains better performance than MR.

Experimental results for Multiple Topology Prototyping applications are described as follows. In previous sections above, the prototyping is demonstrated for layout migration. We further demonstrate routing prototyping for multiple placement topologies of OpAmp under wafer foundry A's 65 nm. To avoid process variation damaging the performance of the analog design, analog placement should take care of several placement constraints, such as symmetry and matching constraints. In the experiments by others multiple placement topologies are generated considering these constraints. Therefore, the data for seven placement topologies from that same prior work are obtained for an advanced experiment.

FIGS. 11A-11G depict screen shots of a graphical user interface (GUI) showing exemplary experimental layout results of embodiments of the present invention applied to the OpAmp circuit under wafer foundry A's 65 nm processing for seven different placement topologies, Topo2-Topo8 respectively. Table 4 displays the wire length, performance and timing data for MR, NAR, and RR, respectively. Overall, Av of RR are better than NAR in all cases of topologies. For bandwidth, RR performs better than NAR in all cases except Topo2. On the other hand, it is observed that PM of RR is on average 3.43 deg worse than NAR. Nevertheless, such quantity of difference in PM has little effect on circuit stability. While NAR obtains better PM performance, other performances are worse than MR and RR. It is observed that RR acquires better solution than NAR and is comparable to MR. RR takes less than half an hour to produce layouts in all cases of topologies. Meanwhile, NAR needs more design time to correct the layout result and it obtains less RtCom in every placement topology than RR. That implies that the layout generators preservation for routing has kept the advantages of the original source design for voltage gain, bandwidth, routing completeness and design time.

To sum up, it is observe that routing inevitably influences the circuit performance when the placement and sizing are already decided or are predetermined. According to experiments, the layout generation methodology according to the present invention reduces the design time and produce reasonable performance for design migration and multiple topology prototyping. A novel methodology for fast analog layout prototyping and migration by layout reuse has been described above. A CDT-based layout extraction and preservation is presented to preserve routing behavior with hierarchy and symmetry constraints. Based on the layout preservation, multiple layout solutions are efficiently generated by routing reconstruction. The layout generator method was validated on a variable-gain amplifier and a folded cascode OpAmp. Experimental results demonstrate that the layout generator method has the capability of preserving the routing behavior of the reference layout. The layout generator for prototyping generates layouts that have comparable performance with manual routing. Over 70% of routing wire-lengths are generated automatically in all cases, which directly accelerates design time for prototyping and migration.

Figure 12:
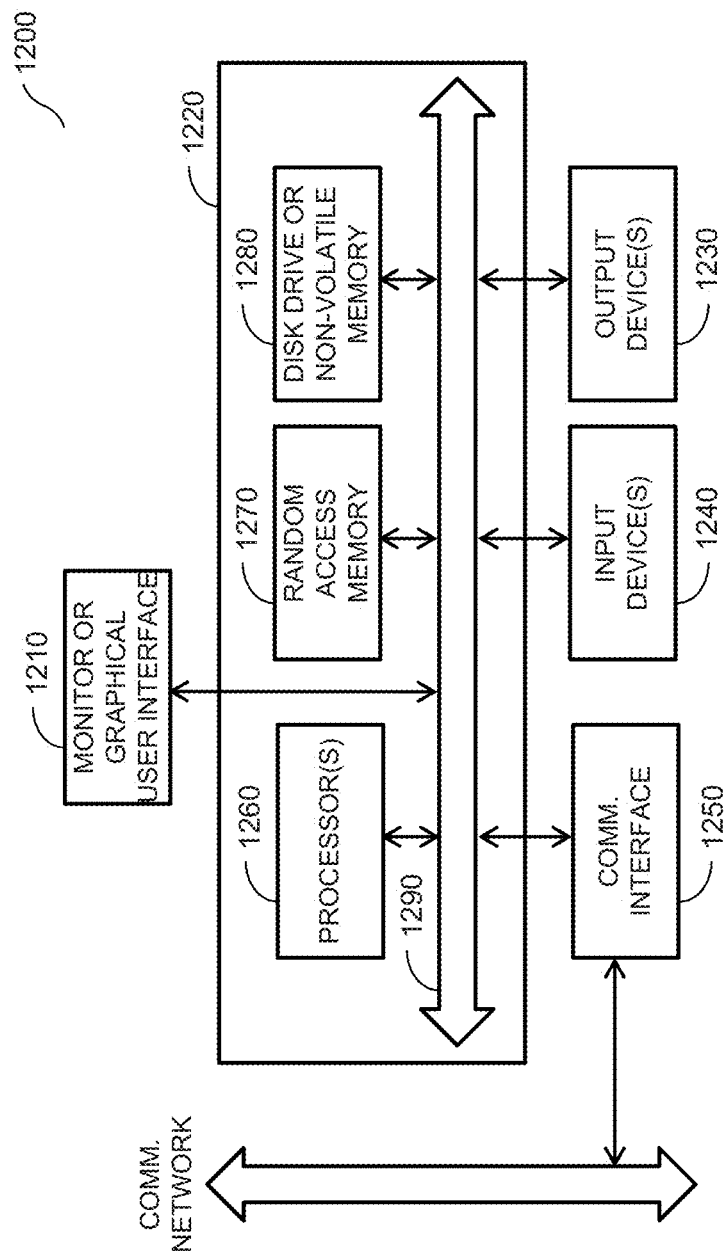
FIG. 12 is a block diagram of a computer system that may incorporate embodiments of the present invention.

FIG. 12 is a simplified block diagram of a computer system that may incorporate embodiments of the present invention. FIG. 12 is merely illustrative of an embodiment incorporating the present invention and does not limit the scope of the invention as recited in the claims. One of ordinary skill in the art would recognize other variations, modifications, and alternatives.

In one embodiment, computer system 1200 typically includes a monitor 1210, a computer 1220, user output devices 1230, user input devices 1240, communications interface 1250, and the like.

As shown in FIG. 12, computer 1220 may include a processor(s) 1260 that communicates with a number of peripheral devices via a bus subsystem 1290. These peripheral devices may include user output devices 1230, user input devices 1240, communications interface 1250, and a storage subsystem, such as random access memory (RAM) 1270 and disk drive 1280.

User input devices 1230 include all possible types of devices and mechanisms for inputting information to computer system 1220. These may include a keyboard, a keypad, a touch screen incorporated into the display, audio input devices such as voice recognition systems, microphones, and other types of input devices. In various embodiments, user input devices 1230 are typically embodied as a computer mouse, a trackball, a track pad, a joystick, wireless remote, drawing tablet, voice command system, eye tracking system, and the like. User input devices 1230 typically allow a user to select objects, icons, text and the like that appear on the monitor 1210 via a command such as a click of a button or the like.

User output devices 1240 include all possible types of devices and mechanisms for outputting information from computer 1220. These may include a display (e.g., monitor 1210), non-visual displays such as audio output devices, etc.

Communications interface 1250 provides an interface to other communication networks and devices. Communications interface 1250 may serve as an interface for receiving data from and transmitting data to other systems. Embodiments of communications interface 1250 typically include an Ethernet card, a modem (telephone, satellite, cable, ISDN), (asynchronous) digital subscriber line (DSL) unit, FireWire interface, USB interface, and the like. For example, communications interface 1250 may be coupled to a computer network, to a FireWire bus, or the like. In other embodiments, communications interfaces 1250 may be physically integrated on the motherboard of computer 1220, and may be a software program, such as soft DSL, or the like.

In various embodiments, computer system 1200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1220 includes one or more Xeon® microprocessors from Intel® as processor(s) 1260. Further, one embodiment, computer 1220 includes a UNIX-based operating system.

RAM 1270 and disk drive 1280 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 1270 and disk drive 1280 may be configured to store the basic programming and data constructs that provide the functionality of the present invention.

Software code modules and instructions that provide the functionality of the present invention may be stored in RAM 1270 and disk drive 1280. These software modules may be executed by processor(s) 1260. RAM 1270 and disk drive 1280 may also provide a repository for storing data used in accordance with the present invention.

RAM 1270 and disk drive 1280 may include a number of memories including a main random access memory (RAM) for storage of instructions and data during program execution and a read only memory (ROM) in which fixed instructions are stored. RAM 1270 and disk drive 1280 may include a file storage subsystem providing persistent (non-volatile) storage for program and data files. RAM 1270 and disk drive 1280 may also include removable storage systems, such as removable flash memory.

Bus subsystem 1290 provides a mechanism for letting the various components and subsystems of computer 1220 communicate with each other as intended. Although bus subsystem 1290 is shown schematically as a single bus, alternative embodiments of the bus subsystem may utilize multiple busses.

FIG. 12 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the technique and system of the present invention is suitable for use with a wide variety of EDA tools and methodologies for designing, testing, and/or manufacturing integrated circuits or other electronic devices. The scope of the invention should, therefore, be determined not with reference to the above description, but instead should be determined with reference to the pending claims along with their full scope or equivalents.

What is claimed is:

1. A computer implemented method for routing a solution path of an integrated circuit design, the method comprising:

extracting, using the computer, from a source layout of the integrated circuit design a position of a source path disposed along a first side of a first block of the integrated circuit design and a first side of a second block of the integrated circuit design, when the computer is invoked to route the solution path; and generating, using the computer, in a solution layout the solution path while maintaining the position of the source path along the first side of the first block and the first side of the second block, wherein a nearest distance between the first and second blocks in the source layout is scaled in the solution layout by a first number and at least one edge of either the first or second blocks in the source layout is scaled in the solution layout by a second number different from the first number.

2. The computer implemented method of claim 1 further comprising:

extracting, using the computer, from the source layout a position of the source path disposed along the first side of the first block and a first side of a third block after extracting the position of the source path disposed along the first side of the first block and the first side of the second block thereby hierarchically extracting the position of the source path; and generating, using the computer, in the solution layout the solution path while maintaining the source path along the first side of the first block and the first side of the third block.

3. The computer implemented method of claim 2, wherein the first and second blocks are clustered in accordance with symmetry and proximity constraints.

4. The computer implemented method of claim 1, wherein the solution path is included in an analog circuit.

5. The computer implemented method of claim 1, wherein extracting further includes transforming the source layout into a planar straight-line graph via a triangulation algorithm.

6. The computer implemented method of claim 5, wherein transforming further includes generating a crossing graph associated with a plurality of crossing points disposed at the intersection between the source path and a plurality of edges dividing a source routing plane into a plurality of non-overlapping triangles except where the first and second blocks of the source layout are disposed.

7. The computer implemented method of claim 6, wherein the source routing plane is a region of the source layout where the source path is disposed.

8. The computer implemented method of claim 6, wherein at least one of the plurality of edges represents a geometrical relationship between the first block, the second block, of the source layout and the source routing plane.

9. The computer implemented method of claim 6, wherein the plurality of non-overlapping triangles include a plurality of vertices each disposed at a different one of a plurality of corners of the first block, the second block, and the source routing plane and disposed along at least a different one of a plurality of edges of the source routing plane.

10. The computer implemented method of claim 6, wherein transforming further includes storing at least one path direction associated with one of the plurality of crossing points.

11. The computer implemented method of claim 5, wherein the planar straight-line graph includes a plurality of edges dividing a source routing plane into a plurality of non-overlapping triangles except where the first and second blocks of the source layout are disposed, the source routing plane being a region of the source layout where the source path is disposed, wherein a pair of vertices define each different one of the plurality of edges when the pair of vertices are disposed on the same edge of one of the plurality of non-overlapping triangles or when the pair of vertices are disposed adjacently on the source path.

12. The computer implemented method of claim 6, wherein generating a solution path further includes:

recovering the planar straight-line graph in accordance with the solution layout; and generating a plurality of segments in accordance with the plurality of crossing points included in the recovered planar straight-line graph, the solution path including the plurality of segments.

13. The computer implemented method of claim 12, wherein the plurality of non-overlapping triangles of the source layout include a plurality of vertices each disposed at a different one of a plurality of corners of the first block, the second block, the source routing plane and disposed along at least a different one of a plurality of edges of the source routing plane, wherein recovering the planar straight-line graph includes repositioning each of the plurality of vertices associated with the different ones of the plurality of corners when at least one of the plurality of corners is repositioned in the solution layout.

14. The computer implemented method of claim 12, wherein transforming further includes storing at least one path direction associated with one of the plurality of crossing points, wherein generating a plurality of segments is further in accordance with the at least one path direction.

15. A non-transitory computer-readable storage medium comprising instructions which when executed by a computer cause the computer to:

extract from a source layout of an integrated circuit design a position of a source path disposed along a first side of a first block of the integrated circuit design and a first side of a second block of the integrated circuit design, when the computer is invoked to route the solution path; and generate in a solution layout the solution path while maintaining the position of the source path along the first side of the first block and the first side of the second block, wherein a nearest distance between the first and second blocks in the source layout is scaled in the solution layout by a first number and at least one edge of either the first or second blocks in the source layout is scaled in the solution layout by a second number different from the first number.

16. The non-transitory computer-readable storage medium of claim 15 further comprising instructions that cause the computer to:

extract from the source layout a position of the source path disposed along the first side of the first block and a first side of a third block after extracting the position of the source path disposed along the first side of the first block and the first side of the second block thereby hierarchically extracting the position of the source path; and generate in the solution layout the solution path while maintaining the source path along the first side of the first block and the first side of the third block.

17. The non-transitory computer-readable storage medium of claim 16, wherein the first and second blocks are clustered in accordance with symmetry and proximity constraints.

18. The non-transitory computer-readable storage medium of claim 15, wherein the solution path is included in an analog circuit.

19. The non-transitory computer-readable storage medium of claim 15, wherein the instructions that cause the computer to extract further causes the computer to transform the source layout into a planar straight-line graph via a triangulation algorithm.

20. The non-transitory computer-readable storage medium of claim 19, wherein the instructions that cause the computer to transform further causes the computer to generate a crossing graph associated with a plurality of crossing points disposed at the intersection between the source path and a plurality of edges that divide a source routing plane into a plurality of non-overlapping triangles except where the first and second blocks of the source layout are disposed.

21. The non-transitory computer-readable storage medium of claim 20, wherein the source routing plane is a region of the source layout where the source path is disposed.

22. The non-transitory computer-readable storage medium of claim 20, wherein at least one of the plurality of edges represents a geometrical relationship between the first block, the second block, of the source layout and the source routing plane.

23. The non-transitory computer-readable storage medium of claim 20, wherein the plurality of non-overlapping triangles include a plurality of vertices each disposed at a different one of a plurality of corners of the first block, the second block, and the source routing plane and disposed along at least a different one of a plurality of edges of the source routing plane.

24. The non-transitory computer-readable storage medium of claim 20, wherein the instructions that causes the computer to transform further cause the computer to store at least one path direction associated with one of the plurality of crossing points.

25. The non-transitory computer-readable storage medium of claim 19, wherein the planar straight-line graph includes a plurality of edges that divide a source routing plane into a plurality of non-overlapping triangles except where the first and second blocks of the source layout are disposed, the source routing plane being a region of the source layout where the source path is disposed, wherein a pair of vertices define each different one of the plurality of edges when the pair of vertices are disposed on the same edge of one of the plurality of non-overlapping triangles or when the pair of vertices are disposed adjacently on the source path.

26. The non-transitory computer-readable storage medium of claim 20, wherein the instructions that cause the computer to generate a crossing graph further causes the computer to:
   recover the planar straight-line graph in accordance with the solution layout; and
   generate a plurality of segments in accordance with the plurality of crossing points included in the recovered planar straight-line graph, the solution path including the plurality of segments.

27. The non-transitory computer-readable storage medium of claim 26, wherein the plurality of non-overlapping triangles of the source layout include a plurality of vertices each disposed at a different one of a plurality of corners of the first block, the second block, the source routing plane and disposed along at least a different one of a plurality of edges of the source routing plane, wherein recovering the planar straight-line graph includes repositioning each of the plurality of vertices associated with the different ones of the plurality of corners when at least one of the plurality of corners is repositioned in the solution layout.

28. The non-transitory computer-readable storage medium of claim 26, wherein the instructions that cause the computer to transform further cause the computer to store at least one path direction associated with one of the plurality of crossing points, wherein the instructions that cause the computer to generate a plurality of segments are further in accordance with the at least one path direction.

29. A system for routing a solution path of an integrated circuit design, said system configured to:
   extract from a source layout of the integrated circuit design a position of a source path disposed along a first side of a first block of the integrated circuit design and a first side of a second block of the integrated circuit design, when the computer is invoked to route the solution path; and
   generate in a solution layout the solution path while maintaining the position of the source path along the first side of the first block and the first side of the second block, wherein a nearest distance between the first and second blocks in the source layout is scaled in the solution layout by a first number and at least one edge of either the first or second blocks in the source layout is scaled in the solution layout by a second number different from the first number.

30. The system of claim 29 further configured to:
   extract from the source layout a position of the source path disposed along the first side of the first block and a first side of a third block after extracting the position of the source path disposed along the first side of the first block and the first side of the second block thereby hierarchically extracting the position of the source path; and
   generate in the solution layout the solution path while maintaining the source path along the first side of the first block and the first side of the third block.

31. The system of claim 30, wherein the first and second blocks are clustered in accordance with symmetry and proximity constraints.

32. The system of claim 29, wherein the solution path is included in an analog circuit.

33. The system of claim 29 further configured to transform the source layout into a planar straight-line graph via a triangulation algorithm.

34. The system of claim 33 further configured to generate a crossing graph associated with a plurality of crossing points disposed at the intersection between the source path and a plurality of edges that divide a source routing plane into a plurality of non-overlapping triangles except where the first and second blocks of the source layout are disposed.

35. The system of claim 34, wherein the source routing plane is a region of the source layout where the source path is disposed.

36. The system of claim 34, wherein at least one of the plurality of edges represents a geometrical relationship between the first block, the second block, of the source layout and the source routing plane.

37. The system of claim 34, wherein the plurality of non-overlapping triangles include a plurality of vertices each disposed at a different one of a plurality of corners of the first block, the second block, and the source routing plane and disposed along at least a different one of a plurality of edges of the source routing plane.

38. The system of claim 34 further configured to store at least one path direction associated with one of the plurality of crossing points.

39. The system of claim 33, wherein the planar straight-line graph includes a plurality of edges that divide a source routing plane into a plurality of non-overlapping triangles except where the first and second blocks of the source layout are disposed, the source routing plane being a region of the source layout where the source path is disposed, wherein a pair of vertices define each different one of the plurality of edges when the pair of vertices are disposed on the same edge of one of the plurality of non-overlapping triangles or when the pair of vertices are disposed adjacently on the source path.

40. The system of claim 34 further configured to:
   recover the planar straight-line graph in accordance with the solution layout; and
   generate a plurality of segments in accordance with the plurality of crossing points included in the recovered planar straight-line graph, the solution path including the plurality of segments.

41. The system of claim 40, wherein the plurality of non-overlapping triangles of the source layout include a plurality of vertices each disposed at a different one of a plurality of corners of the first block, the second block, the source routing plane and disposed along at least a different one of a plurality of edges of the source routing plane, wherein recovering the planar straight-line graph includes repositioning each of the plurality of vertices associated with the different ones of the plurality of corners when at least one of the plurality of corners is repositioned in the solution layout.

42. The system of claim 40 further configured to store at least one path direction associated with one of the plurality of crossing points, wherein the instructions that cause the computer to generate a plurality of segments are further in accordance with the at least one path direction.

* * * * *